United States Patent
Denenberg et al.

(10) Patent No.: US 11,613,017 B2
(45) Date of Patent: *Mar. 28, 2023

(54) SAFETY-RATED MULTI-CELL WORKSPACE MAPPING AND MONITORING

(71) Applicants: Scott Denenberg, Newton, MA (US); Patrick Sobalvarro, Harvard, MA (US); Clara Vu, Cambridge, MA (US); Alberto Moel, Cambridge, MA (US); Richard A. Kelsey, Belmont, MA (US)

(72) Inventors: Scott Denenberg, Newton, MA (US); Patrick Sobalvarro, Harvard, MA (US); Clara Vu, Cambridge, MA (US); Alberto Moel, Cambridge, MA (US); Richard A. Kelsey, Belmont, MA (US)

(73) Assignee: VEO ROBOTICS, INC., Waltham, MA (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/375,447

(22) Filed: Jul. 14, 2021

(65) Prior Publication Data

US 2021/0339396 A1 Nov. 4, 2021

Related U.S. Application Data

(63) Continuation of application No. 16/800,427, filed on Feb. 25, 2020, now Pat. No. 11,097,422, which is a (Continued)

(51) Int. Cl.
*G06T 17/10* (2006.01)
*B25J 9/16* (2006.01)
(Continued)

(52) U.S. Cl.
CPC .......... *B25J 9/1666* (2013.01); *B25J 9/1676* (2013.01); *B25J 9/1697* (2013.01); *G01S 7/4808* (2013.01);
(Continued)

(58) Field of Classification Search
CPC ........ G01S 17/04; G01S 7/4808; G06T 17/10
See application file for complete search history.

(56) References Cited

U.S. PATENT DOCUMENTS 5,574,637 A 11/1996 Obata et al.
9,452,531 B2 9/2016 Kikkeri et al.
(Continued)

FOREIGN PATENT DOCUMENTS

JP 2018/207349 A 12/2018

OTHER PUBLICATIONS

International Search Report and the Written Opinion of the International Searching Authority, for International Application No. PCT/US2020/019658, dated May 20, 2020, 12 pages.
(Continued)

*Primary Examiner* — Edward Park
(74) *Attorney, Agent, or Firm* — Morgan, Lewis & Bockius LLP

(57) ABSTRACT

Safety systems in distributed factory workcells intercommunicate or communicate with a central controller so that when a person, robot or vehicle passes from one workcell or space into another on the same factory floor, the new workcell or space need not repeat the tasks of analysis and classification and can instead immediately integrate the new entrant into the existing workcell or space-monitoring schema. The workcell or space can also communicate attributes such as occlusions, unsafe areas, movement speed, and object trajectories, enabling rapid reaction by the monitoring system of the new workcell or space.

28 Claims, 6 Drawing Sheets

Related U.S. Application Data continuation-in-part of application No. 16/129,999, filed on Sep. 13, 2018, now Pat. No. 10,899,007, which is a continuation of application No. 15/889,523, filed on Feb. 6, 2018, now Pat. No. 10,099,372.

(60) Provisional application No. 62/811,073, filed on Feb. 27, 2019, provisional application No. 62/455,834, filed on Feb. 7, 2017, provisional application No. 62/455,828, filed on Feb. 7, 2017.

(51) Int. Cl.
    *G01S 17/89* (2020.01)
    *G01S 7/48* (2006.01)
    *G01S 17/04* (2020.01)
    *G01S 17/87* (2020.01)
    *G01V 8/20* (2006.01)
    *G06T 17/05* (2011.01)

(52) U.S. Cl.
    CPC .............. *G01S 17/04* (2020.01); *G01S 17/87* (2013.01); *G01S 17/89* (2013.01); *G06T 17/10* (2013.01); *G01V 8/20* (2013.01); *G05B 2219/40202* (2013.01); *G06T 17/05* (2013.01); *Y10S 901/47* (2013.01); *Y10S 901/49* (2013.01)

(56) References Cited

U.S. PATENT DOCUMENTS

| | | |
|---|---|---|
| 10,099,372 B2 | 10/2018 | Vu et al. |
| 10,445,944 B2 | 10/2019 | Galera et al. |
| 10,812,778 B1 * | 10/2020 | Wang .................. G01B 11/0608 |
| 10,899,007 B2 | 1/2021 | Vu et al. |
| 11,097,422 B2 * | 8/2021 | Denenberg ............. B25J 9/1676 |
| 2005/0224479 A1 | 10/2005 | Watanabe |
| 2016/0354927 A1 | 12/2016 | Kikkeri et al. |
| 2017/0302905 A1 | 10/2017 | Shteinfeld et al. |
| 2018/0151012 A1 | 5/2018 | Kuraoka |
| 2018/0222052 A1 | 8/2018 | Vu et al. |
| 2020/0206928 A1 | 7/2020 | Denenberg et al. |

OTHER PUBLICATIONS

Japanese Office Action, Japanese Application No. 2021-549787, dated Oct. 4, 2022, 5 pages.

* cited by examiner

SAFETY-RATED MULTI-CELL WORKSPACE MAPPING AND MONITORING

CROSS-REFERENCE TO RELATED APPLICATIONS

This application is a continuation of U.S. patent application Ser. No. 16/800,427, filed Feb. 25, 2020, which is a continuation-in-part of U.S. Ser. No. 16/129,999, filed on Sep. 13, 2018, which is itself a continuation of U.S. Ser. No. 15/889,523, now U.S. Pat. No. 10,099,372, which claims priority to U.S. Provisional Application Nos. 62/455,828 and 62/455,834, both filed on Feb. 7, 2017. U.S. patent application Ser. No. 16/800,427, filed Feb. 25, 2020, also claims priority to, and the benefits of, U.S. Provisional Application No. 62/811,073, filed on Feb. 27, 2019. The entire disclosures of all of the foregoing documents are incorporated by reference herein.

FIELD OF THE INVENTION

The field of the invention relates, generally, to monitoring of industrial environments where humans and machinery interact or come into proximity, and in particular to systems and methods for detecting unsafe conditions in a monitored multi-cell workspace.

BACKGROUND

Modern manufacturing generally involves the sequential execution of a set of manufacturing processes (such as welding, painting, and assembly) in fixed workcells through which the work in progress is moved by a means of transport, e.g., conveyor belts, roller stages, vehicles (guided, autonomous, or controlled or driven by a human, such a forklift, cart or dolly), or humans walking or driving between workcells, carrying the work in progress. A simple and well-known arrangement for manufacturing is the assembly line, where the workcells are arranged in a line and connected through conveyor belts or a chain line that moves the work in progress ("workpieces") through a fixed path. A less common alternative is one where the workpieces remain in a workcell and the manufacturing processes are performed in place, with parts and tools traveling to the workcell as needed for the sequential manufacturing steps. This arrangement is common in situations where the item being manufactured is large or too unwieldy to move between workcells.

Still another arrangement is called cellular manufacturing, in which the workcells are arranged flexibly around the factory floor in order to optimize factors such as workpiece transit time, parts delivery, or the mix of work orders. In cellular manufacturing, individual workcells may be "flexible," i.e., capable of performing different process steps on different workpieces according to the mix of products being produced in a time period; some workcells may perform several sequential steps on an individual workpiece. Cellular manufacturing is particularly advantageous in factories with high variation in work orders, because the factory layout and workflow can be quickly or even dynamically reconfigured.

Each workcell includes machinery and fixturing necessary for the relevant process step. For example, a painting workcell may have a painting robot, paint dispensing and protective equipment, and tooling necessary to load and unload the item being painted. The painting workcell will likely also include a computer or electronic control system that can be programmed to run and manage the equipment in the workcell. An assembly workcell may have the fixturing necessary for holding the workpieces to be assembled, tools for the machines or humans carrying out the assembly step, and conveyors or loading equipment to bring the workpieces in and out of the workcell. Similarly, a milling workcell may have a milling machine at its center, together with fixturing and equipment to load and unload the milling machine, either manually or automatically. The milling machine will likely have a computerized numerical control system governing the necessary operations on workpieces.

Workcells can be fully automated, whereby the loading and unloading of workpieces and the manufacturing steps are all performed by machines; fully manual, where all the steps are carried out by humans (likely using hand or power tools); or something in between, where, for example, a machine is loaded or unloaded by a human, or a human carries out a manufacturing step on parts being handled by a machine. Even though automation levels are continually increasing, humans still dominate the factory floor and the majority of factory tasks are performed by humans.

A factory or manufacturing site can consist of only a few workcells (for example, a simple paint shop) or it can have hundreds of workcells, each implementing a manufacturing step such as those in an automotive plant. Workcells can be adjacent to one another, so work in progress is passed from workcell to workcell (via, for example, a conveyor belt, a guide rail, or a gravity chute), or workcells can instead be separated by lanes to allow humans or vehicles to pass. Sometimes, workcells of a certain type (for example, welding or painting workcells) are grouped together in a physical space so all workpieces that need to be painted or welded are brought in and out of the paint or weld shop.

Increasingly, factory process flows and production profiles are controlled via computers, using manufacturing execution systems (ESs) or other factory-control systems. The factory-control systems aggregate factory floor-level state information from the workcells, such as whether they are operating or not, their production rates, fault states, maintenance requirements, and other indicators. More broadly, MESs are used not just in factories, but also in other applications where it is necessary to track the states and conditions of a large number of items and equipment, such as a warehouse or distribution center. The equivalent of an MES system in a warehouse or distribution center is known as a warehouse-management system (WMS). WMSs focus more on the location and availability of goods in storage, but also track the state of specialized workcells used in warehouses, such as picking stations or palletizers.

At the lowest level, this information is collected by field sensors and actuators in the workcell, in the machines in the workcells, or in the areas containing work in progress (or goods in process in a warehouse). These sensors and actuators may continuously collect information on position, pressure, temperature, weight, motion, vibration, or the absence or presence of an indicator from which the state of the machines can be ascertained. This information can also be provided by humans in the workspace, who can ascertain the states of machinery and work in progress and provide that information via human-machine interfaces on the factory floor.

These low-level data points collected by the sensors and actuators or by humans are then aggregated through peripheral devices such as programmable logic controllers (PLCs) or industrial microcontroller units, and up to a supervisory control and data acquisition (SCADA) system. The SCADA (or equivalent) system collects, analyzes, and presents this information to the MES system and to plant operators and workers through graphical and other user interfaces, allowing them to see and respond to the state of the individual workcells and of the entire manufacturing plant. In a warehouse, the SCADA system may focus more on inventory control and item tracking using, for example, bar code scanners and object identification sensors and actuators.

Increasing computational performance and rapidly dropping sensor and actuation costs are driving the adoption of these SCADA and MES systems, effectively making manufacturing platforms "smarter." This model for organizing production by introducing perceiving, active, and context-aware manufacturing control systems is often referred to as "Industry 4.0." Instead of an open-loop, low data-intensity static manufacturing process, increasing levels of computerized control are introducing automation and autonomy on the factory floor. Such automation and autonomy add context-awareness to the factory floor so that individual manufacturing steps or workcells can be viewed as services. These services can be then combined in possibly arbitrary ways, allowing for flexible and cost-effective manufacturing even in small lot sizes or with high product variability. Cellular assembly can particularly benefit from automation, because it enables a multi-directional layout in which work in progress is shuttled between workcells on driverless transport systems or autonomous mobile robots. Instead of the fixed conveyor of the assembly line, the autonomous transport systems are guided between workcells by laser scanners, radio-frequency identification (RFID) technology, fiducials, or other guidance and mapping technologies. Such an approach enables quick assembly layout changes and flexible manufacturing.

As noted above, an alternative manufacturing arrangement is one in which the work in progress remains stationary in some steps and the machines and humans performing the work are brought to the workcell on mobile devices, which can be autonomous or driven by humans. For example, in automotive assembly, the car body can remain in a single location while mobile robotic arms (which can be simply a robot mounted on an autonomous vehicle) approach the workcell together with mobile vehicles carrying parts to be mounted on the vehicle (such as tires, doors, or the engine block). The mobile robot can perform its task, possibly in collaboration with humans, and then move on to another workcell with another car body. In the extreme, the workcells themselves can be mobile, performing manufacturing tasks while simultaneously shuttling the work in progress around the factory to additional stationary workcells.

Capital goods manufacturers, such as automakers, experiment with these cellular manufacturing concepts as a solution to the problem of car model diversity. A single model may be available in sedan, hatchback, and convertible versions, but may also be available in different powertrains, such as diesel, plug-in hybrid, or even electric. Some models require more time for wiring electrical systems or installing customer-specific options such as heated seats or sunroofs. This extra time slows down the traditional assembly line where the workcells are adjacent to each other and connected with a conveyor belt or a chain pulling the work in progress, as the line moves along with the slowest manufacturing workcell step. Further, workers and machines in these customer-specific workcells remain idle when cars coming down the assembly line do not require a specific option such as a sunroof. Cellular assembly can speed up the line and reduce idle time by redirecting vehicles to vacant workstations at a steady pace.

Warehouse operators are also increasing the intensity of automation, introducing large numbers of automated guided or autonomous vehicles and robots in addition to automated retrieval and storage systems, conveyors, automated picking stations, palletizers, and depalletizers. These increasing levels of automation mean that humans and machines in warehouses are now increasingly interacting in close proximity to each other, and there is a need for WMSs to manage not just equipment and inventories, but also the humans in the warehouse.

Although these advanced SCADA and MES factory and warehouse control systems are becoming more powerful, flexible, and pervasive, their focus is on the machinery and equipment (both mobile and fixed) on the factory floor, and not on the humans working with and next to the machines being monitored, or on the interactions between the humans and the machines. The vast majority of manufacturing workcells and work in progress transportation in the factory floor still require human input and effort. Humans frequently load and unload machines, carry out manufacturing operations with the support of machines, and move workpieces around the factory. Even "lights out" factory or warehouse floors (which do not require human input during operation) have humans regularly enter the "lights out" space for maintenance, fault recovery, or equipment upgrade.

Because industrial machinery is often dangerous to humans, the most common approach to preventing harm to humans is to keep the humans and machines separate using equipment known as guarding. One very simple and common type of guarding is a cage that surrounds the machinery, configured such that opening the door of the cage causes an electrical circuit to shut down the machinery. This ensures that humans can never approach the machinery while it is operating. More sophisticated types of guarding may involve, for example, optical sensors. Examples include light curtains that determine if any object has intruded into a region defined by one or more light emitters and detectors, and 2D LIDAR sensors that use active optical sensing to detect the minimum distance to an obstacle along a series of rays emanating from the sensor, and thus can be configured to detect either proximity or intrusion into pre-configured 2D zones. Advances in robotic safety controllers have enabled more sophisticated programming of static and dynamic safety regions, allowing closer human-machine interaction.

Some approaches, such as those used with collaborative robots, rely on detecting collisions with the machines through force, torque, or capacitive sensors; limiting forces through active or passive compliance; limiting machine or robot speeds; or cushioning or padding dangerous strike zones or pinch points on the machinery. However, none of these approaches prevents collisions, which limits their viability and usefulness in safety systems.

Moving vehicles (both human-operated and driverless, which can be guided via a positioning system or completely autonomous) pose special problems, as they must prevent unintended collisions with humans on the factory floor while allowing access to the vehicle when relevant, for example, when loading or unloading a goods carrier or entering a forklift. Several solutions have been developed for the safe interaction between mobile vehicles and humans. The simplest approach is to place a strict upper bound on the speed of mobile platforms operating around humans, traveling at speeds slow enough so that they can stop before reaching a human or the human can react quickly enough to avoid colliding with the machine. However, if the vehicle has onboard sensing for safety, and that sensing cannot see around corners, then obstructions in the operating space can allow humans to emerge in proximity to the vehicle, substantially reducing the top speed at which the vehicle can safely travel.

Other approaches involve a passive warning signal or active sensing mounted either on the vehicle or the surrounding environment. Passive approaches include audible signals that can be heard by humans in the area surrounding the moving vehicle, or warning spotlights mounted on the moving vehicle to project a beam ahead and behind the vehicle's path, alerting humans of its presence. A more information-rich passive warning system is the use of 2D cameras, which can be monitored by the vehicle driver either on the vehicle (for example, a human-operated forklift) or remotely. All of these passive approaches have limitations. The audible signals may not be heard by humans on a loud factory floor; the visual signals may not be bright enough or may be occluded by equipment or fixtures; and the 2D cameras rely on constant operator attention to trigger a danger condition, and hence are limited in their ability to prevent accidents.

Active approaches include the use of RFID tags or other transponder methods, which human operators wear while on the factory floor. Receivers on the vehicles or on the surrounding environment can detect these RFID tags or transponders and signal the human or vehicle when a collision or dangerous situation is imminent. Other approaches are based on radar, LIDAR, or ultrasound technologies, usually mounted on the front and rear, or at the corners of moving vehicles.

All of these 2D approaches are limited by their ability to clearly detect intrusions in 3D, and are quite sensitive to ambient conditions, such as temperature changes and illumination. Further, their field of view is limited by their orientation and installation on the moving vehicle. A forward-facing 2D LIDAR placed at a corner of a moving vehicle (a frequent application of 2D LIDAR) can only "see" what is in its range of vision, and not behind the vehicle or around corners. Moreover, because it can only do so in 2D, entry of an obstruction from above or below its field of view would go undetected. These vision field-of-view constraints and occlusions limit the operating speed of the vehicle, reducing efficiency and cycle times.

Another approach utilizes 2D or 3D cameras on the moving vehicle for obstacle tracking and identification. Existing vision-based systems using cameras work well when humans are not occluded, well-separated and clearly visible. Humans who are prone, bending down, or partially occluded by machinery or other humans are much harder to identify and track. Stereo and RGB cameras are also prone to performance variations from changes in environmental conditions, such as temperature, lighting, or vibrations.

What is needed are systems and methods for reliably and safely detecting, classifying, and tracking all objects in a workspace, including humans as well as fixed and mobile machinery, and among different workcells. This detection, classification, and tracking should be in 3D, from all directions, and considering dynamic occlusions so that they can be incorporated into the factory or warehouse control system as one more element of the factory or warehouse. This would allow the machines in the factory or warehouse to "sense" the proximity of humans and respond safely to their presence, by (for example) shutting down, stopping, or alerting humans to their presence.

SUMMARY

Embodiments of the invention facilitate communication among workcells or distributed monitoring systems so that when a person, robot or vehicle passes from one workcell or space into another on the same factory floor, the new workcell or space need not repeat the tasks of analysis and classification and can instead immediately integrate the new entrant into the existing workcell or space-monitoring schema. The workcell or space can also communicate attributes such as occlusions, unsafe areas, movement speed, and object trajectories, enabling rapid reaction by the monitoring system of the new workcell or space. The workcells or spaces can be configured to communicate directly with their nearest neighbors, or communications can be handled through a central server. Although the description below relates primarily to manufacturing operations or factories, the concepts are also applicable to any other workspace where humans and machines need to interact, such as a warehouse, a distribution center, or a power plant.

Embodiments of the invention facilitate communication among workcells or distributed monitoring systems so that when a person, robot or vehicle passes from one workcell or space into another on the same factory floor, the new workcell or space need not repeat the tasks of analysis and classification and can instead immediately integrate the new entrant into the existing workcell or space-monitoring schema. The workcell or space can also communicate attributes such as occlusions, unsafe areas, movement speed, and object trajectories, enabling rapid reaction by the monitoring system of the new workcell or space. The workcells or spaces can be configured to communicate directly with their nearest neighbors, or communications can be handled through a central server.

Methods and systems in accordance herewith may facilitate safe monitoring of an arbitrary number of workcells and workspaces in a factory or a warehouse by connecting or linking a plurality of individual and independent workcell and workspace monitoring systems. As used herein, the term "workspace" refers to the space between workcells on, e.g., a factory floor; humans and vehicles in the workspace may access workcells or move work in progress between workcells. Individual workcell monitoring systems may cover a specific workcell, a workspace surrounding multiple workcells, or workspaces connecting workcells (for example, transport lanes for vehicles between workcells or for human access).

In various embodiments, regions within a monitored workcell may be marked as occupied, unoccupied or unknown; only empty space can ultimately be considered safe, and only when any additional safety criteria—e.g., minimum distance from a piece of controlled machinery—is satisfied. In general, raw data from each sensor is analyzed to determine whether, throughout the zone of coverage corresponding to the sensor, an object or boundary of the 3D mapped space has been definitively detected. As a person moves within a 3D space, he or she will typically occlude some areas from some sensors, resulting in areas of space that are temporarily unknown. Additionally, moving machinery such as an industrial robot arm can also temporarily occlude some areas. When the person or machinery moves to a different location, one or more sensors will once again be able to observe the unknown space and return it to the confirmed-empty state and therefore safe for the robot or machine to operate in this space. Accordingly, in some embodiments, space may also be classified as "potentially occupied." Unknown space is considered potentially occupied when a condition arises where unknown space could be occupied. This could occur when unknown space is adjacent to entry points to the workspace or if unknown space is adjacent to occupied or potentially occupied space. The potentially occupied space "infects" unknown space at a rate that is representative of a human moving through the workspace. Potentially occupied space stays potentially occupied until it is observed to be empty. For safety purposes, potentially occupied space is treated the same as occupied space.

For some sensor modalities such as those relying on an active optical signal, the ability of a sensor to definitively detect an object or boundary falls off rapidly with distance; that is, beyond a certain distance, a sensor may not be capable of distinguishing between an object and empty space, since the associated illumination levels are too similar. Points or regions at such locations are marked as "unknown" with respect to the relevant sensor, and regions so marked cannot be confirmed as empty by that sensor.

Accordingly, in a first aspect, the invention relates to a safety system for identifying safe regions in a three-dimensional workspace that includes controlled machinery and a plurality of workcells distributed about the workspace. In various embodiments, the system comprises, in each workcell, a plurality of sensors distributed about the workcell, where each of the sensors is associated with a grid of pixels for recording images of a portion of the workcell within a sensor field of view; a controller configured to (i) register the sensors with respect to each other so that the images obtained by the sensors collectively represent the workspace; (ii) generate a three-dimensional representation of the workcell as a plurality of volumes; (iii) map one or more safe volumetric zones within the workcell, where the volumetric zones are outside a safety zone of the machinery; (iv) receive, from a second controller, a three-dimensional representation of at least a portion of an adjacent workcell as a plurality of volumes; and (v) transmit, to the second controller, at least a portion of the three-dimensional representation of the workcell as a plurality of volumes.

In various embodiments, the controller is further configured to classify each of the volumes as unoccupied, occupied or unknown, and the safe volumetric zones are marked as unoccupied. The volumes in the three-dimensional representation received from the second controller may be classified as unoccupied, occupied or unknown.

In some embodiments, the controller is further configured to transmit, to the second controller, predicted movements objects in the workcell into the adjacent workcell. The points may be voxels and the safety zone may be a 3D volume surrounding at least a portion of the machinery. The workcell portions may partially overlap.

The second controller may be responsive to the predicted movements and be configured to alter operation of machinery in the adjacent workcell response to a predicted intrusion into a safety zone of the second workcell. The second controller may be configured to computationally extend the predicted intrusion into the workcell in accordance with a model of human movement and/or a trajectory of an autonomous guided vehicle. The trajectory may, for example, be communicated by the autonomous guided vehicle to the second controller.

In various embodiments, the sensors are 3D sensors, e.g., time-of-flight cameras. Alternatively or in addition, at least some of the sensors may be 3D LIDAR sensors.

In another aspect, the invention pertains to a safety system for identifying safe regions in a three-dimensional workspace including controlled machinery and a plurality of workcells distributed about the workspace. In various embodiments, the system comprises a supervisory controller and, in each workcell, (i) a plurality of sensors distributed about the workcell, each of the sensors being associated with a grid of pixels for recording images of a portion of the workcell within a sensor field of view, the workcell portions at least partially overlapping with each other, and (ii) a local controller configured to (A) register the sensors with respect to each other so that the images obtained by the sensors collectively represent the workcell; (B) generate a three-dimensional representation of the workcell as a plurality of volumes; (C) map one or more safe volumetric zones within the workcell, where the volumetric zones are outside a safety zone of the machinery; and (D) transmit, to the supervisory controller, at least a portion of the three-dimensional representation of the workcell as a plurality of volumes. The supervisory controller may be configured to transmit, to each local controller, predicted movements objects into the workcell associated with the local controller based on data received from other local controllers.

In various embodiments, the local controller is further configured to classify each of the volumes as unoccupied, occupied or unknown, where the safe volumetric zones are marked as unoccupied. The points may be voxels and the safety zone may be a 3D volume surrounding at least a portion of the machinery. The local controller of each workcell may be responsive to the predicted movements and may be configured to alter operation of machinery in the workcell in response to a predicted intrusion into a safety zone thereof. For example, each local controller may be configured to computationally extend a predicted intrusion into the workcell in accordance with a model of human movement.

At least some of the sensors may be 3D sensors, e.g., time-of-flight cameras and/or 3D LIDAR sensors.

In general, as used herein, the term "substantially" means±10%, and in some embodiments, ±5%. In addition, reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

In the following discussion, we describe an integrated system for monitoring a workspace, classifying regions therein for safety purposes, and dynamically identifying safe states. In some cases the latter function involves semantic analysis of a robot in the workspace and identification of the workpieces with which it interacts. It should be understood, however, that these various elements may be implemented separately or together in desired combinations; the inventive aspects discussed herein do not require all of the described elements, which are set forth together merely for ease of presentation and to illustrate their interoperability. The system as described represents merely one embodiment.

1. Workcell Monitoring

Figure 1:
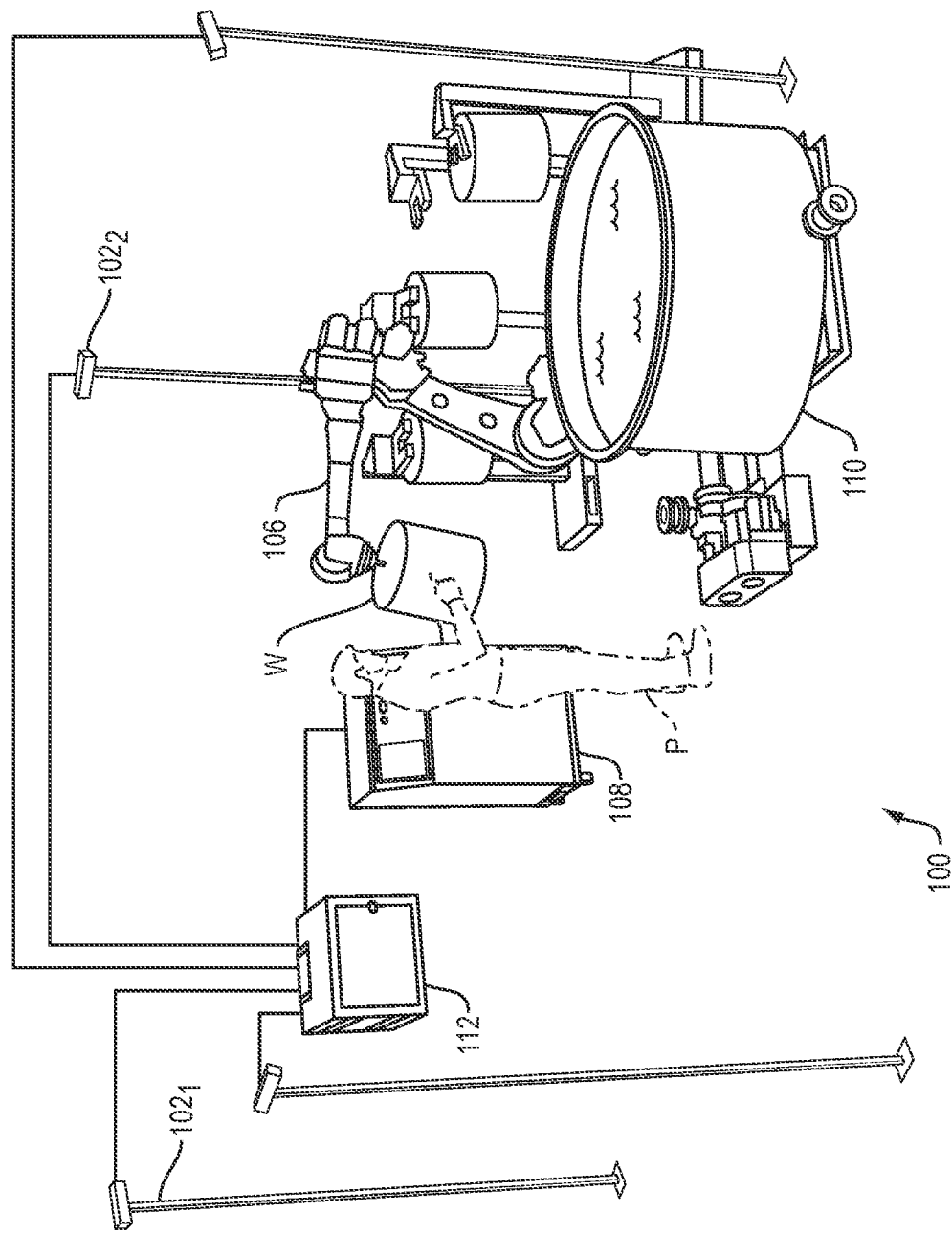
FIG. 1 is a perspective view of a monitored workspace in accordance with an embodiment of the invention.

Refer first to FIG. 1, which illustrates a representative 3D workcell 100 monitored by a plurality of sensors representatively indicated at $102_1$ and $102_2$. The sensors 102 may be conventional optical sensors such as cameras, e.g., 3D time-of-flight cameras, stereo vision cameras, or 3D LIDAR sensors or radar-based sensors, ideally with high frame rates (e.g., between 30 Hz and 100 Hz). The mode of operation of the sensors 102 is not critical so long as a 3D representation of the workcell 100 is obtainable from images or other data obtained by the sensors 102. As shown in the figure, sensors 102 collectively cover and can monitor the workcell 100, which includes a robot 106 controlled by a conventional robot controller 108. The robot interacts with various workpieces W, and a person P in the workcell 100 may interact with the workpieces and the robot 108. The workcell 100 may also contain various items of auxiliary equipment 110, which can complicate analysis of the workcell by occluding various portions thereof from the sensors. Indeed, any realistic arrangement of sensors will frequently be unable to "see" at least some portion of an active workcell. This is illustrated in the simplified arrangement of FIG. 1: due to the presence of the person P, at least some portion of robot controller 108 may be occluded from all sensors. In an environment that people traverse and where even stationary objects may be moved from time to time, the unobservable regions will shift and vary.

Figure 2:
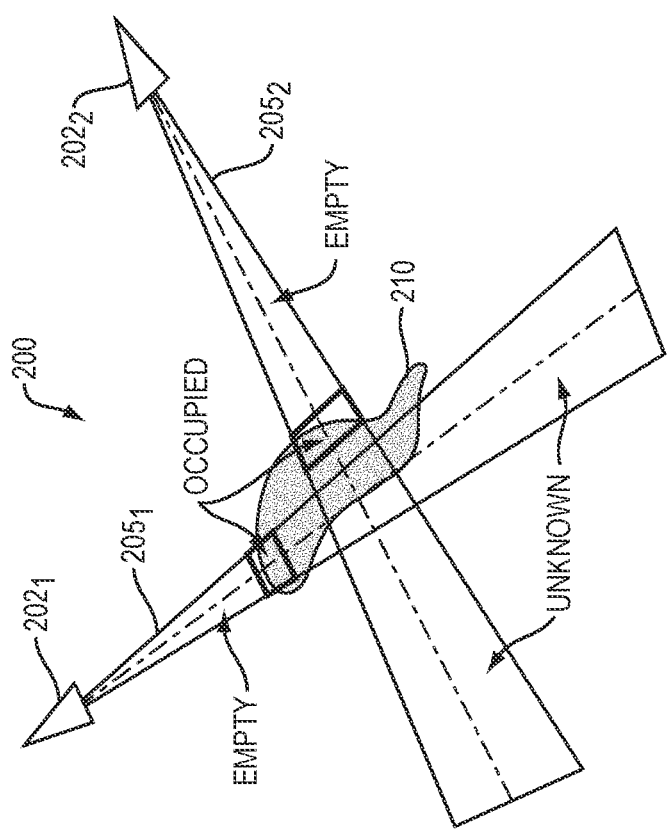
FIG. 2 schematically illustrates classification of regions within the monitored workspace in accordance with an embodiment of the invention.

As shown in FIG. 2, embodiments of the present invention classify workcell regions as occupied, unoccupied (or empty), or unknown. For ease of illustration, FIG. 2 shows two sensors $202_1$, $202_2$ and their zones of coverage $205_1$, $205_2$ within the workcell 200 in two dimensions; similarly, only the 2D footprint 210 of a 3D object is shown. The portions of the coverage zones 205 between the object boundary and the sensors 200 are marked as unoccupied, because each sensor affirmatively detects no obstructions in this intervening space. The space at the object boundary is marked as occupied. In a coverage zone 205 beyond an object boundary, all space is marked as unknown; the corresponding sensor is configured to sense occupancy in this region but, because of the intervening object 210, cannot do so.

With renewed reference to FIG. 1, data from each sensor 102 is received by a control system 112. The volume of space covered by each sensor—typically a solid cone—may be represented in any suitable fashion, e.g., the space may be divided into a 3D grid of small (5 cm, for example) cubes or "voxels" or other suitable form of volumetric representation. For example, workcell 100 may be represented using 2D or 3D ray tracing, where the intersections of the 2D or 3D rays emanating from the sensors 102 are used as the volume coordinates of the workcell 100. This ray tracing can be performed dynamically or via the use of precomputed volumes, where objects in the workcell 100 are previously identified and captured by control system 112. For convenience of presentation, the ensuing discussion assumes a voxel representation; control system 112 maintains an internal representation of the workcell 100 at the voxel level, with voxels marked as occupied, unoccupied, or unknown.

Figure 3:
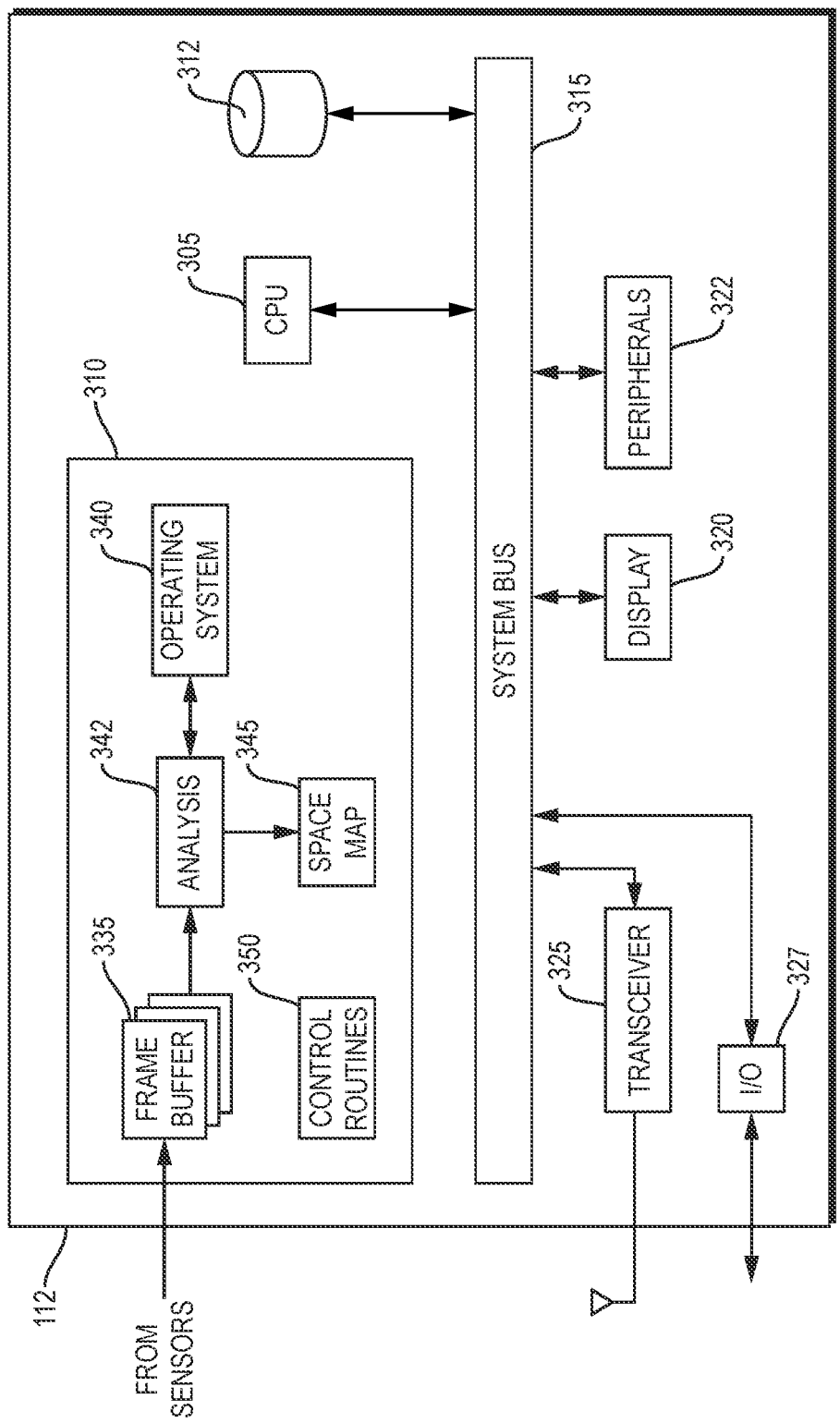
FIG. 3 schematically illustrates a control system in accordance with an embodiment of the invention.

FIG. 3 illustrates, in greater detail, a representative embodiment of control system 112, which may be implemented on a general-purpose computer. The control system 112 includes a central processing unit (CPU) 305, system memory 310, and one or more non-volatile mass storage devices (such as one or more hard disks and/or optical storage units) 312. The system 112 further includes a bidirectional system bus 315 over which the CPU 305, memory 310, and storage device 312 communicate with each other as well as with internal or external input/output (I/O) devices such as a display 320 and peripherals 322, which may include traditional input devices such as a keyboard or a mouse). The control system 112 also includes a wireless transceiver 325 and one or more I/O ports 327. Transceiver 325 and I/O ports 327 may provide a network interface. The term "network" is herein used broadly to connote wired or wireless networks of computers or telecommunications devices (such as wired or wireless telephones, tablets, etc.). For example, a computer network may be a local area network (LAN) or a wide area network (WAN). When used in a LAN networking environment, computers may be connected to the LAN through a network interface or adapter; for example, a supervisor may establish communication with control system 112 using a tablet that wirelessly joins the network. When used in a WAN networking environment, computers typically include a modem or other communication mechanism. Modems may be internal or external and may be connected to the system bus via the user-input interface, or other appropriate mechanism. Networked computers may be connected over the Internet, an Intranet, Extranet, Ethernet, or any other system that provides communications. Some suitable communications protocols include TCP/IP, UDP, or OSI, for example. For wireless communications, communications protocols may include IEEE 802.11x ("Wi-Fi"), Bluetooth, ZigBee, IrDa, near-field communication (NFC), or other suitable protocol. Furthermore, components of the system may communicate through a combination of wired or wireless paths, and communication may involve both computer and telecommunications networks.

CPU 305 is typically a microprocessor, but in various embodiments may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, graphics processing unit (GPU), smart chip, or any other device or arrangement of devices that is capable of implementing the steps of the processes of the invention.

The system memory 310 contains a series of frame buffers 335, i.e., partitions that store, in digital form (e.g., as pixels or voxels, or as depth maps), images obtained by the sensors 102; the data may actually arrive via I/O ports 327 and/or transceiver 325 as discussed above. System memory 310 contains instructions, conceptually illustrated as a group of modules, that control the operation of CPU 305 and its interaction with the other hardware components. An operating system 340 (e.g., Windows or Linux) directs the execution of low-level, basic system functions such as memory allocation, file management and operation of mass storage device 312. At a higher level, and as described in greater detail below, an analysis module 342 registers the images in frame buffers 335 and analyzes them to classify regions of the monitored workcell 100. The result of the classification may be stored in a space map 345, which contains a volumetric representation of the workcell 100 with each voxel (or other unit of representation) labeled, within the space map, as described herein. Alternatively, space map 345 may simply be a 3D array of voxels, with voxel labels being stored in a separate database (in memory 310 or in mass storage 312).

Control system 112 may also control the operation or machinery in the workcell 100 using conventional control routines collectively indicated at 350. As explained below, the configuration of the workcell and, consequently, the classifications associated with its voxel representation may well change over time as persons and/or machines move about, and control routines 350 may be responsive to these changes in operating machinery to achieve high levels of safety. All of the modules in system memory 310 may be programmed in any suitable programming language, including, without limitation, high-level languages such as C, C++, C#, Ada, Basic, Cobra, Fortran, Java, Lisp, Perl, Python, Ruby, or low-level assembly languages.

1.1 Sensor Registration

In a typical multi-sensor system, the precise location of each sensor 102 with respect to all other sensors is established during setup. Sensor registration is usually performed automatically and should be as simple as possible to allow for ease of setup and reconfiguration. Assuming for simplicity that each frame buffer 335 stores an image (which may be refreshed periodically) from a particular sensor 102, analysis module 342 may register sensors 102 by comparing all or part of the image from each sensor to the images from other sensors in frame buffers 335, and using conventional computer-vision techniques to identify correspondences in those images. Suitable global-registration algorithms, which do not require an initial registration approximation, generally fall into two categories: feature-based methods and intensity-based methods. Feature-based methods identify correspondences between image features such as edges while intensity-based methods use correlation metrics between intensity patterns. Once an approximate registration is identified, an Iterative Closest Point (ICP) algorithm or suitable variant thereof may be used to fine-tune the registration.

If there is sufficient overlap between the fields of view of the various sensors 102, and sufficient detail in the workcell 100 to provide distinct sensor images, it may be sufficient to compare images of the static workcell. If this is not the case, a "registration object" having a distinctive signature in 3D can be placed in a location within workcell 100 where it can be seen by all sensors. Alternatively, registration can be achieved by having the sensors 102 record images of one or more people standing in the workcell or walking throughout the workcell over a period of time, combining a sufficient number of partially matching images until accurate registration is achieved.

Registration to machinery within the workcell 100 can, in some cases, be achieved without any additional instrumentation, especially if the machinery has a distinctive 3D shape (for example, a robot arm), so long as the machinery is visible to at least one sensor registered with respect to the others. Alternatively, a registration object can be used, or a user interface, shown in display 320 and displaying the scene observed by the sensors, may allow a user to designate certain parts of the image as key elements of the machinery under control. In some embodiments, the interface provides an interactive 3D display that shows the coverage of all sensors to aid in configuration. If the system is be configured with some degree of high-level information about the machinery being controlled (for purposes of control routines 350, for example)—such as the location(s) of dangerous part or parts of the machinery and the stopping time and/or distance—analysis module 342 may be configured to provide intelligent feedback as to whether the sensors are providing sufficient coverage, and suggest placement for additional sensors.

For example, analysis module 342 can be programmed to determine the minimum distance from the observed machinery at which it must detect a person in order to stop the machinery by the time the person reaches it (or a safety zone around it), given conservative estimates of walking speed. (Alternatively, the required detection distance can be input directly into the system via display 320.) Optionally, analysis module 342 can then analyze the fields of view of all sensors to determine whether the space is sufficiently covered to detect all approaches. If the sensor coverage is insufficient, analysis module 342 can propose new locations for existing sensors, or locations for additional sensors, that would remedy the deficiency. Otherwise, the control system will default to a safe state and control routines 350 will not permit machinery to operate unless analysis module 342 verifies that all approaches can be monitored effectively. Use of machine learning and genetic or evolutionary algorithms can be used to determine optimal sensor placement within a cell. Parameters to optimize include but are not limited to minimizing occlusions around the robot during operation and observability of the robot and workpieces.

If desired, this static analysis may include "background" subtraction. During an initial startup period, when it may be safely assumed there no objects intruding into the workcell 100, analysis module 342 identifies all voxels occupied by the static elements. Those elements can then be subtracted from future measurements and not considered as potential intruding objects. Nonetheless, continuous monitoring is performed to ensure that the observed background image is consistent with the space map 345 stored during the startup period. Background can also be updated if stationary objects are removed or are added to the workcell There may be some areas that sensors 102 cannot observe sufficiently to provide safety, but that are guarded by other methods such as cages, etc. In this case, the user interface can allow the user to designate these areas as safe, overriding the sensor-based safety analysis. Safety-rated soft-axis and rate limitations can also be used to limit the envelope of the robot to improve performance of the system.

Once registration has been achieved, sensors 102 should remain in the same location and orientation while the workcell 100 is monitored. If one or more sensors 102 are accidentally moved, the resulting control outputs will be invalid and could result in a safety hazard. Analysis module 342 may extend the algorithms used for initial registration to monitor continued accuracy of registration. For example, during initial registration analysis module 342 may compute a metric capturing the accuracy of fit of the observed data to a model of the work cell static elements that is captured during the registration process. As the system operates, the same metric can be recalculated. If at any time that metric exceeds a specified threshold, the registration is considered to be invalid and an error condition is triggered; in response, if any machinery is operating, a control routine 350 may halt it or transition the machinery to a safe state.

1.2 Identifying Occupied and Potentially Occupied Areas

Once the sensors have been registered, control system 112 periodically updates space map 345—at a high fixed frequency (e.g., every analysis cycle) in order to be able to identify all intrusions into workcell 100. Space map 345 reflects a fusion of data from some or all of the sensors 102. But given the nature of 3D data, depending on the locations of the sensors 102 and the configuration of workcell 100, it is possible that an object in one location will occlude the sensor's view of objects in other locations, including objects (which may include people or parts of people, e.g. arms) that are closer to the dangerous machinery than the occluding object. Therefore, to provide a reliably safe system, the system monitors occluded space as well as occupied space.

In one embodiment, space map 345 is a voxel grid. In general, each voxel may be marked as occupied, unoccupied or unknown; only empty space can ultimately be considered safe, and only when any additional safety criteria—e.g., minimum distance from a piece of controlled machinery—is satisfied. Raw data from each sensor is analyzed to determine whether, for each voxel, an object or boundary of the 3D mapped space has been definitively detected in the volume corresponding to that voxel. To enhance safety, analysis module 342 may designate as empty only voxels that are observed to be empty by more than one sensor 102. Again, all space that cannot be confirmed as empty is marked as unknown. Thus, only space between a sensor 102 and a detected object or mapped 3D space boundary along a ray may be marked as empty.

If a sensor detects anything in a given voxel, all voxels that lie on the ray beginning at the focal point of that sensor and passing through the occupied voxel, and which are between the focal point and the occupied voxel, are classified as unoccupied, while all voxels that lie beyond the occupied voxel on that ray are classified as occluded for that sensor; all such occluded voxels are considered "unknown." Information from all sensors may be combined to determine which areas are occluded from all sensors; these areas are considered unknown and therefore unsafe. Analysis module 342 may finally mark as "unoccupied" only voxels or workcell volumes that have been preliminarily marked at least once (or, in some embodiments, at least twice) as "unoccupied." Based on the markings associated with the voxels or discrete volumes within the workcell, analysis module 342 may map one or more safe volumetric zones within space map 345. These safe zones are outside a safety zone of the machinery and include only voxels or workcell volumes marked as unoccupied.

A common failure mode of active optical sensors that depend on reflection, such as LIDAR and time-of-flight cameras, is that they do not return any signal from surfaces that are insufficiently reflective, and/or when the angle of incidence between the sensor and the surface is too shallow. This can lead to a dangerous failure because this signal can be indistinguishable from the result that is returned if no obstacle is encountered; the sensor, in other words, will report an empty voxel despite the possible presence of an obstacle. This is why ISO standards for e.g. 2D LIDAR sensors have specifications for the minimum reflectivity of objects that must be detected; however, these reflectivity standards can be difficult to meet for some 3D sensor modalities such as ToF. In order to mitigate this failure mode, analysis module 342 marks space as empty only if some obstacle is definitively detected at further range along the same ray. By pointing sensors slightly downward so that most of the rays will encounter the floor if no obstacles are present, it is possible to conclusively analyze most of the workcell 100. But if the sensed light level in a given voxel is insufficient to definitively establish emptiness or the presence of a boundary, the voxel is marked as unknown. The signal and threshold value may depend on the type of sensor being used. In the case of an intensity-based 3D sensor (for example, a ToF camera) the threshold value can be a signal intensity, which may be attenuated by objects in the workcell of low reflectivity. In the case of a stereo vision system, the threshold may be the ability to resolve individual objects in the field of view. Other signal and threshold value combinations can be utilized depending on the type of sensor used.

A safe system can be created by treating all unknown space as though it were occupied. However, in some cases this may be overly conservative and result in poor performance. It is therefore desirable to further classify unknown space according to whether it could potentially be occupied. As a person moves within a 3D space, he or she will typically occlude some areas from some sensors, resulting in areas of space that are temporarily unknown (see FIG. 1). Additionally, moving machinery such as an industrial robot arm can also temporarily occlude some areas. When the person or machinery moves to a different location, one or more sensors will once again be able to observe the unknown space and return it to the confirmed-empty state in which it is safe for the robot or machine to operate. Accordingly, in some embodiments, space may also be classified as "potentially occupied." Unknown space is considered potentially occupied when a condition arises where unknown space could be occupied. This could occur when unknown space is adjacent to entry points to the workcell or if unknown space is adjacent to occupied or potentially occupied space. The potentially occupied space "infects" unknown space at a rate that is representative of a human moving through the workcell. Potentially occupied space stays potentially occupied until it is observed to be empty. For safety purposes, potentially occupied space is treated the same as occupied space. It may be desirable to use probabilistic techniques such as those based on Bayesian filtering to determine the state of each voxel, allowing the system to combine data from multiple samples to provide higher levels of confidence in the results. Suitable models of human movement, including predicted speeds (e.g., an arm may be raised faster than a person can walk), are readily available.

2. Classifying Objects

For many applications, the classification of regions in a workcell as described above may be sufficient—e.g., if control system 112 is monitoring space in which there should be no objects at all during normal operation. In many cases, however, it is desirable to monitor an area in which there are at least some objects during normal operation, such as one or more machines and workpieces on which the machine is operating. In these cases, analysis module 342 may be configured to identify intruding objects that are unexpected or that may be humans. One suitable approach to such classification is to cluster individual occupied voxels into objects that can be analyzed at a higher level.

To achieve this, analysis module 342 may implement any of several conventional, well-known clustering techniques such as Euclidean clustering, K-means clustering and Gibbs-sampling clustering. Any of these or similar algorithms can be used to identify clusters of occupied voxels from 3D point cloud data. Mesh techniques, which determine a mesh that best fits the point-cloud data and then use the mesh shape to determine optimal clustering, may also be used. Once identified, these clusters can be useful in various ways.

One simple way clustering can be used is to eliminate small groups of occupied or potentially occupied voxels that are too small to possibly contain a person. Such small clusters may arise from occupation and occlusion analysis, as described above, and can otherwise cause control system 112 to incorrectly identify a hazard. Clusters can be tracked over time by simply associating identified clusters in each image frame with nearby clusters in previous frames or using more sophisticated image-processing techniques. The shape, size, or other features of a cluster can be identified and tracked from one frame to the next. Such features can be used to confirm associations between clusters from frame to frame, or to identify the motion of a cluster. This information can be used to enhance or enable some of the classification techniques described below. Additionally, tracking clusters of points can be employed to identify incorrect and thus potentially hazardous situations. For example, a cluster that was not present in previous frames and is not close to a known border of the field of view may indicate an error condition.

In some cases, it may be sufficient to filter out clusters below a certain size and to identify cluster transitions that indicate error states. In other cases, however, it may be necessary to further classify objects into one or more of four categories: (1) elements of the machinery being controlled by system 112, (2) the workpiece or workpieces that the machinery is operating on, and (3) other foreign objects, including people, that may be moving in unpredictable ways and that can be harmed by the machinery. It may or may not be necessary to conclusively classify people versus other unknown foreign objects. It may be necessary to definitively identify elements of the machinery as such, because by definition these will always be in a state of "collision" with the machinery itself and thus will cause the system to erroneously stop the machinery if detected and not properly classified. Similarly, machinery typically comes into contact with workpieces, but it is typically hazardous for machinery to come into contact with people. Therefore, analysis module 342 should be able to distinguish between workpieces and unknown foreign objects, especially people.

Elements of the machinery itself may be handled for classification purposes by the optional background-subtraction calibration step described above. In cases where the machinery changes shape, elements of the machinery can be identified and classified, e.g., by supplying analysis module 342 with information about these elements (e.g., as scalable 3D representations), and in some cases (such as industrial robot arms) providing a source of instantaneous information about the state of the machinery. Analysis module 342 may be "trained" by operating machinery, conveyors, etc. in isolation under observation by the sensors 102, allowing analysis module 342 to learn their precise regions of operation resulting from execution of the full repertoire of motions and poses. Analysis module 342 may classify the resulting spatial regions as occupied.

Conventional computer-vision techniques may be employed to enable analysis module 342 to distinguish between workpieces and humans. These include deep learning, a branch of machine learning designed to use higher levels of abstraction in data. The most successful of these deep-learning algorithms have been convolutional neural networks (CNNs) and more recently recurrent neural networks (RNNs). However, such techniques are generally employed in situations where accidental misidentification of a human as a non-human does not cause safety hazards. In order to use such techniques in the present environment, a number of modifications may be needed. First, machine-learning algorithms can generally be tuned to prefer false positives or false negatives (for example, logistic regression can be tuned for high specificity and low sensitivity). False positives in this scenario do not create a safety hazard—if the robot mistakes a workpiece for a human, it will react conservatively. Additionally, multiple algorithms or neural networks based on different image properties can be used, promoting the diversity that may be key to achieving sufficient reliability for safety ratings. One particularly valuable source of diversity can be obtained by using sensors that provide both 3D and 2D image data of the same object. If any one technique identifies an object as human, the object will be treated as human. Using multiple techniques or machine-learning algorithms, all tuned to favor false positives over false negatives, sufficient reliability can be achieved. In addition, multiple images can be tracked over time, further enhancing reliability—and again every object can be treated as human until enough identifications have characterized it as non-human to achieve reliability metrics. Essentially, this diverse algorithmic approach, rather than identifying humans, identifies things that are definitely not humans.

In addition to combining classification techniques, it is possible to identify workpieces in ways that do not rely on any type of human classification at all. One approach is to configure the system by providing models of workpieces. For example, a "teaching" step in system configuration may simply supply images or key features of a workpiece to analysis module 342, which searches for matching configurations in space map 345, or may instead involving training of a neural network to automatically classify workpieces as such in the space map. In either case, only objects that accurately match the stored model are treated as workpieces, while all other objects are treated as humans.

Another suitable approach is to specify particular regions within the workcell, as represented in the space map 345, where workpieces will enter (such as the top of a conveyor belt). Only objects that enter the workcell in that location are eligible for treatment as workpieces. The workpieces can then be modeled and tracked from the time they enter the workcell until the time they leave. While a monitored machine such as a robot is handling a workpiece, control system 112 ensures that the workpiece is moving only in a manner consistent with the expected motion of the robot end effector. Known equipment such as conveyor belts can also be modeled in this manner. Humans may be forbidden from entering the work cell in the manner of a workpiece—e.g., sitting on conveyors.

All of these techniques can be used separately or in combination, depending on design requirements and environmental constraints. In all cases, however, there may be situations where analysis module 342 loses track of whether an identified object is a workpiece. In these situations the system should fall back to a safe state. An interlock can then be placed in a safe area of the workcell where a human worker can confirm that no foreign objects are present, allowing the system to resume operation.

In some situations a foreign object enters the workcell, but subsequently should be ignored or treated as a workpiece. For example, a stack of boxes that was not present in the workcell at configuration time may subsequently be placed therein. This type of situation, which will become more common as flexible systems replace fixed guarding, may be addressed by providing a user interface (e.g., shown in display 320 or on a device in wireless communication with control system 112) that allows a human worker to designate the new object as safe for future interaction. Of course, analysis module 342 and control routines 350 may still act to prevent the machinery from colliding with the new object, but the new object will not be treated as a potentially human object that could move towards the machinery, thus allowing the system to handle it in a less conservative manner.

3. Generating Control Outputs

At this stage, analysis module 342 has identified all objects in the monitored area 100 that must be considered for safety purposes. Given these data, a variety of actions can be taken and control outputs generated. During static calibration or with the workcell in a default configuration free of humans, space map 345 may be useful to a human for evaluating sensor coverage, the configuration of deployed machinery, and opportunities for unwanted interaction between humans and machines. Even without setting up cages or fixed guards, the overall workcell layout may be improved by channeling or encouraging human movement through the regions marked as safe zones, as described above, and away from regions with poor sensor coverage.

Control routines 350, responsive to analysis module 342, may generate control signals to operating machinery, such as robots, within workcell 100 when certain conditions are detected. This control can be binary, indicating either safe or unsafe conditions, or can be more complex, such as an indication of what actions are safe and unsafe. The simplest type of control signal is a binary signal indicating whether an intrusion of either occupied or potentially occupied volume is detected in a particular zone. In the simplest case, there is a single intrusion zone and control system 112 provides a single output indicative of an intrusion. This output can be delivered, for example, via an I/O port 327 to a complementary port on the controlled machinery to stop or limit the operation of the machinery. In more complex scenarios, multiple zones are monitored separately, and a control routine 350 issues a digital output via an I/O port 327 or transceiver 325 addressed, over a network, to a target piece of machinery (e.g., using the Internet protocol or other suitable addressing scheme).

Another condition that may be monitored is the distance between any object in the workcell and a machine, comparable to the output of a 2D proximity sensor. This may be converted into a binary output by establishing a proximity threshold below which the output should be asserted. It may also be desirable for the system to record and make available the location and extent of the object closest to the machine. In other applications, such as a safety system for a collaborative industrial robot, the desired control output may include the location, shape, and extent of all objects observed within the area covered by the sensors 102.

4. Safe Action Constraints and Dynamic Determination of Safe Zones

ISO 10218 and ISO/TS 15066 describe speed and separation monitoring as a safety function that can enable collaboration between an industrial robot and a human worker. Risk reduction is achieved by maintaining at least a protective separation distance between the human worker and robot during periods of robot motion. This protective separation distance is calculated using information including robot and human worker position and movement, robot stopping distance, measurement uncertainty, system latency and system control frequency. When the calculated separation distance decreases to a value below the protective separation distance, the robot system is stopped. This methodology can be generalized beyond industrial robotics to machinery.

For convenience, the following discussion focuses on dynamically defining a safe zone around a robot operating in the workcell 100. It should be understood, however, that the techniques described herein apply not only to multiple robots but to any form of machinery that can be dangerous when approached too closely, and which has a minimum safe separation distance that may vary over time and with particular activities undertaken by the machine. As described above, a sensor array obtains sufficient image information to characterize, in 3D, the robot and the location and extent of all relevant objects in the area surrounding the robot at each analysis cycle. (Each analysis cycle includes image capture, refresh of the frame buffers, and computational analysis; accordingly, although the period of the analysis or control cycle is short enough for effective monitoring to occur in real time, it involves many computer clock cycles.) Analysis module 342 utilizes this information along with instantaneous information about the current state of the robot at each cycle to determine instantaneous, current safe action constraints for the robot's motion. The constraints may be communicated to the robot, either directly by analysis module 342 or via a control routine 350, to the robot via transceiver 325 or and I/O port 327.

Figure 4:
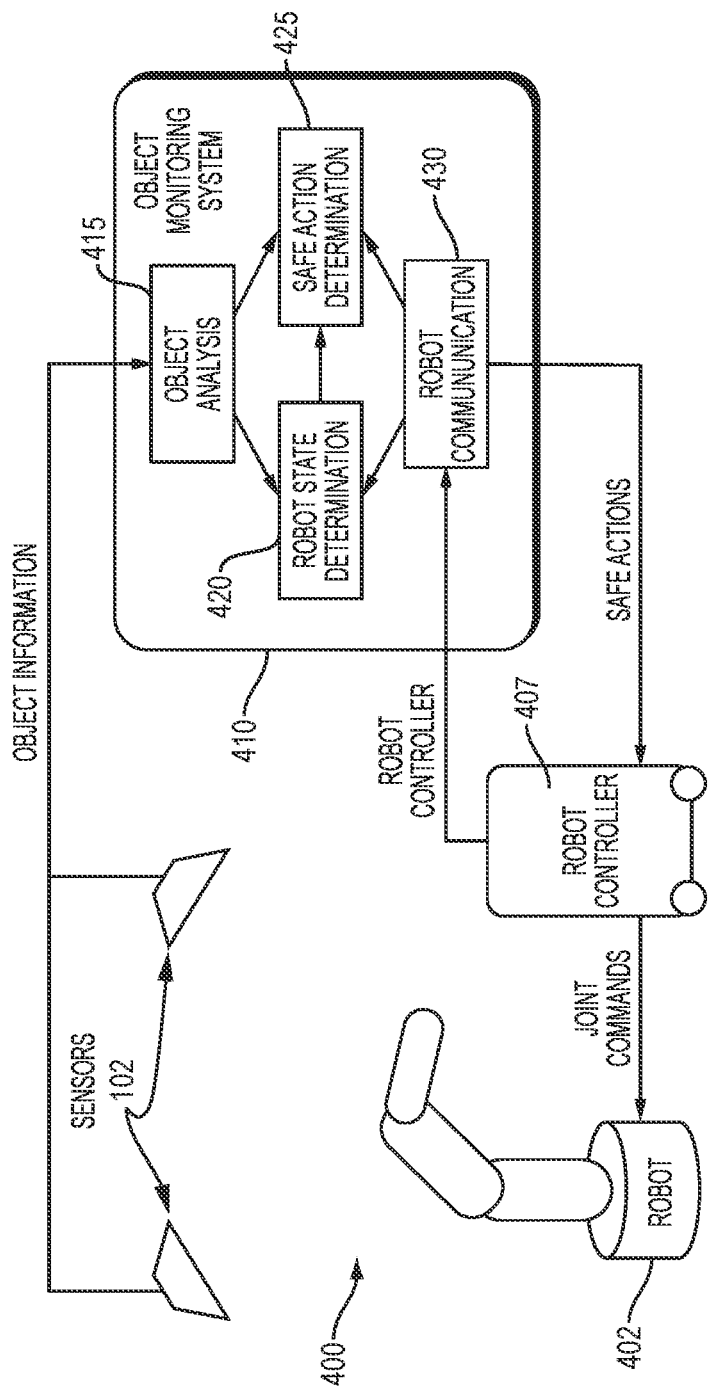
FIG. 4 schematically illustrates an object-monitoring system in accordance with an embodiment of the invention.

The operation of the system is best understood with reference to the conceptual illustration of system organization and operation of FIG. 4. As described above, a sensor array 102 monitors the workcell 400, which includes a robot 402. The robot's movements are controlled by a conventional robot controller 407, which may be part of or separate from the robot itself; for example, a single robot controller may issue commands to more than one robot. The robot's activities may primarily involve a robot arm, the movements of which are orchestrated by robot controller 407 using joint commands that operate the robot arm joints to effect a desired movement. An object-monitoring system (OMS) 410 obtains information about objects from the sensors 102 and uses this sensor information to identify relevant objects in the workcell 400. OMS 410 communicates with robot controller 407 via any suitable wired or wireless protocol. (In an industrial robot, control electronics typically reside in an external control box. However, in the case of a robot with a built-in controller, OMS 410 communicates directly with the robot's onboard controller.) Using information obtained from the robot (and, typically, sensors 102), OMS 410 determines the robot's current state. OMS 410 thereupon determines safe-action constraints for robot 402 given the robot's current state and all identified relevant objects.

Finally, OMS 410 communicates the safe action constraints to robot 407. (It will be appreciated that, with reference to FIG. 3, the functions of OMS 410 are performed in a control system 112 by analysis module 342 and, in some cases, a control routine 350.)

4.1 Identifying Relevant Objects

The sensors 102 provide real-time image information that is analyzed by an object-analysis module 415 at a fixed frequency in the manner discussed above; in particular, at each cycle, object analysis module 415 identifies the 3D location and extent of all objects in workcell 400 that are either within the robot's reach or that could move into the robot's reach at conservative expected velocities. If not all of the relevant volume is within the collective field of view of the sensors 102, OMS 410 may be configured to so determine and indicate the location and extent of all fixed objects within that region (or a conservative superset of those objects) and/or verify that other guarding techniques have been used to prevent access to unmonitored areas.

4.2 Determining Robot State

A robot state determination module (RSDM) 420 is responsive to data from sensors 102 and signals from the robot 402 and/or robot controller 407 to determine the instantaneous state of the robot. In particular, RSDM 420 determines the pose and location of robot 402 within workcell 400; this may be achieved using sensors 102, signals from the robot and/or its controller, or data from some combination of these sources. RSDM 420 may also determine the instantaneous velocity of robot 402 or any appendage thereof; in addition, knowledge of the robot's instantaneous joint accelerations or torques, or planned future trajectory may be needed in order to determine safe motion constraints for the subsequent cycle as described below. Typically, this information comes from robot controller 407, but in some cases may be inferred directly from images recorded by sensors 102 as described below.

For example, these data could be provided by the robot 402 or the robot controller 407 via a safety-rated communication protocol providing access to safety-rated data. The 3D pose of the robot may then be determined by combining provided joint positions with a static 3D model of each link to obtain the 3D shape of the entire robot 402.

In some cases, the robot may provide an interface to communicate joint positions that is not safety-rated, in which case the joint positions can be verified against images from sensors 102 (using, for example, safety-rated software). For example, received joint positions may be combined with static 3D models of each link to generate a 3D model of the entire robot 402. This 3D image can be used to remove any objects in the sensing data that are part of the robot itself. If the joint positions are correct, this will fully eliminate all object data attributed to the robot 402. If, however, the joint positions are incorrect, the true position of robot 402 will diverge from the model. In the previous cycle, it can be assumed that the joint positions were correct because otherwise robot 402 would have been halted. The detection of an incorrect reported robot position can then be used to trigger an error condition, which will cause control system 112 (see FIG. 1) to transition robot 402 to a safe state. Sensor data can be used to identify the position of the robot using a correlation algorithm, such as described above in the section on registration, and this detected position can be compared with the joint position reported by the robot. If the joint position information provided by robot 402 has been validated in this manner, it can be used to validate joint velocity information, which can then be used to predict future joint positions. If these positions are inconsistent with previously validated actual joint positions, the program can similarly trigger an error condition. These techniques enable use of a non-safety-rated interface to produce data that can then be used to perform additional safety functions.

Finally, RSDM 420 may be configured to determine the robot's joint state using only image information provided by sensors 102, without any information provided by robot 402 or controller 407 sensors 102. Given a model of all of the links in the robot, any of several conventional, well-known computer vision techniques can be used by RSDM 420 to register the model to sensor data, thus determining the location of the modeled object in the image. For example, the ICP algorithm (discussed above) minimizes the difference between two 3D point clouds. ICP often provides a locally optimal solution efficiently, and thus can be used accurately if the approximate location is already known. This will be the case if the algorithm is run every cycle, since robot 402 cannot have moved far from its previous position. Accordingly, globally optimal registration techniques, which may not be efficient enough to run in real time, are not required. Digital filters such as Kalman filters or particle filters can then be used to determine instantaneous joint velocities given the joint positions identified by the registration algorithm.

These image-based monitoring techniques often rely on being run at each system cycle, and on the assumption that the system was in a safe state at the previous cycle. Therefore, a test may be executed in when robot 402 is started— for example, confirming that the robot is in a known, pre-configured "home" position and that all joint velocities are zero. It is common for automated equipment to have a set of tests that are executed by an operator at a fixed interval, for example, when the equipment is started up or on shift changes. Reliable state analysis typically requires an accurate model of each robot link. This model can be obtained a priori, e.g. from 3D CAD files provided by the robot manufacturer or generated by industrial engineers for a specific project. However, such models may not be available, at least not for the robot and all of the possible attachments it may have.

In this case, it is possible for RSDM 420 to create the model itself, e.g., using sensors 102. This may be done in a separate training mode where robot 402 runs through a set of motions, e.g., the motions that are intended for use in the given application and/or a set of motions designed to provide sensors 102 with appropriate views of each link. It is possible, but not necessary, to provide some basic information about the robot a priori, such as the lengths and rotational axes of each link. During this training mode, RSDM 420 generates a 3D model of each link, complete with all necessary attachments. This model can then be used by RSDM 420 in conjunction with sensor images to determine the robot state.

4.3 Determining Safe-Action Constraints

In traditional axis- and rate-limitation applications, an industrial engineer calculates what actions are safe for a robot, given the planned trajectory of the robot and the layout of the workcell—forbidding some areas of the robot's range of motion altogether and limiting speed in other areas. These limits assume a fixed, static workplace environment. Here we are concerned with dynamic environments in which objects and people come, go, and change position; hence, safe actions are calculated by a safe-action determination module (SADM) 425 in real time based on all sensed relevant objects and on the current state of robot 402, and these safe actions may be updated each cycle. In order to be considered safe, actions should ensure that robot 402 does not collide with any stationary object, and also that robot 402 does not come into contact with a person who may be moving toward the robot. Since robot 402 has some maximum possible deceleration, controller 407 should be instructed to begin slowing the robot down sufficiently in advance to ensure that it can reach a complete stop before contact is made.

Figure 5:
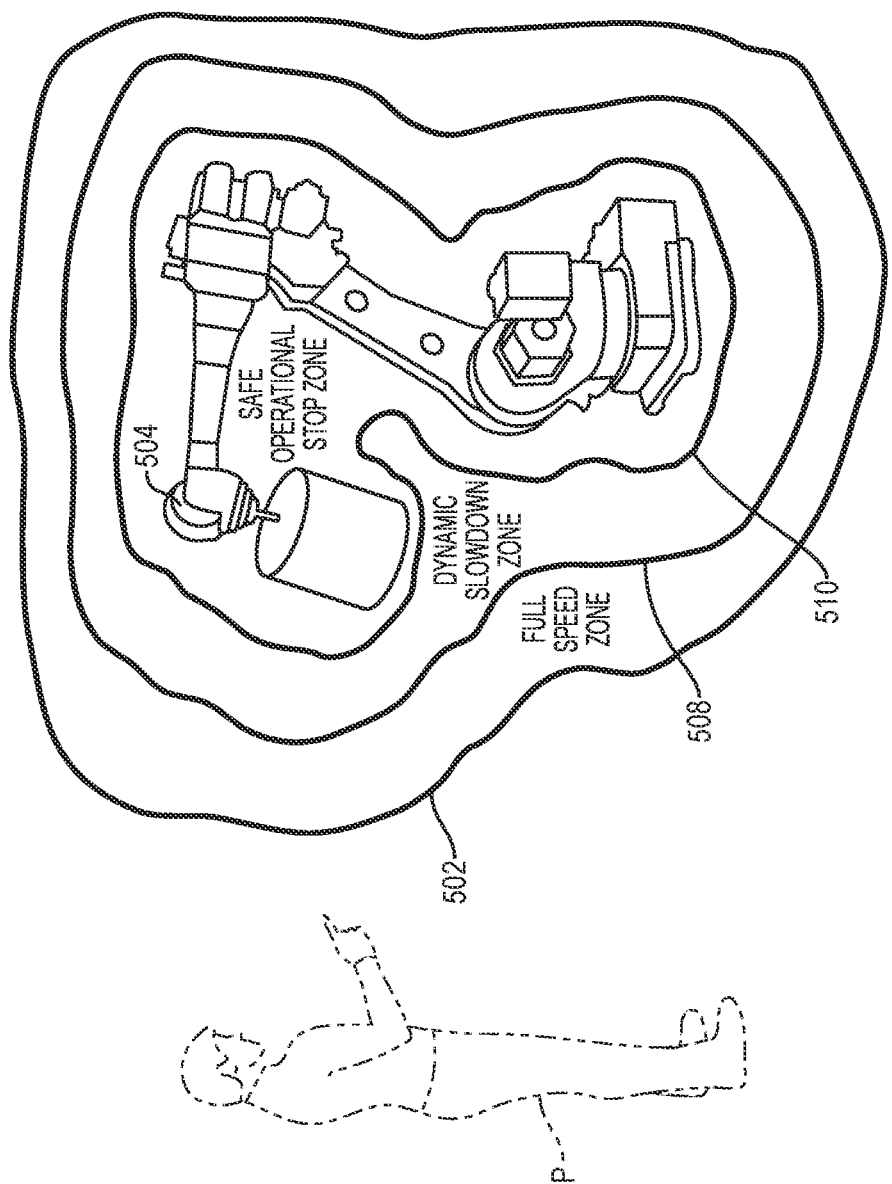
FIG. 5 schematically illustrates the definition of progressive safety envelopes in proximity to a piece of industrial machinery.

One approach to achieving this is to modulate the robot's maximum velocity (by which is meant the velocity of the robot itself or any appendage thereof) proportionally to the minimum distance between any point on the robot and any point in the relevant set of sensed objects to be avoided. The robot is allowed to operate at maximum speed when the closest object is further away than some threshold distance beyond which collisions are not a concern, and the robot is halted altogether if an object is within a certain minimum distance. Sufficient margin can be added to the specified distances to account for movement of relevant objects or humans toward the robot at some maximum realistic velocity. This is illustrated in FIG. 5. An outer envelope or 3D zone 502 is generated computationally by SADM 425 around the robot 504. Outside this zone 502, all movements of the person P are considered safe because, within an operational cycle, they cannot bring the person sufficiently close to the robot 504 to pose a danger. Detection of any portion of the person P's body within a second 3D zone 508, computationally defined within zone 502, is registered by SADM 425 but robot 504 is allowed to continue operating at full speed. If any portion of the person P crosses the threshold of zone 508 but is still outside an interior danger zone 510, robot 504 is signaled to operate at a slower speed. If any portion of the person P crosses into the danger zone 510 or is predicted to do so within the next cycle based on a model of human movement operation of robot 504 is halted. These zones may be updated if robot 504 is moved (or moves) within the environment.

A refinement of this technique is for SADM 425 to control maximum velocity proportionally to the square root of the minimum distance, which reflects the fact that in a constant-deceleration scenario, velocity changes proportionally to the square root of the distance traveled, resulting in a smoother and more efficient, but still equally safe, result. A further refinement is for SADM 425 to modulate maximum velocity proportionally to the minimum possible time to collision—that is, to project the robot's current state forward in time, project the intrusions toward the robot trajectory, and identify the nearest potential collision. This refinement has the advantage that the robot will move more quickly away from an obstacle than toward it, which maximizes throughput while still correctly preserving safety. Since the robot's future trajectory depends not just on its current velocity but on subsequent commands, SADM 425 may consider all points reachable by robot 402 within a certain reaction time given its current joint positions and velocities, and cause control signals to be issued based on the minimum collision time among any of these states. Yet a further refinement is for SADM 425 to take into account the entire planned trajectory of the robot when making this calculation, rather than simply the instantaneous joint velocities. Additionally, SADM 425 may, via robot controller 407, alter the robot's trajectory, rather than simply alter the maximum speed along that trajectory. It is possible to choose from among a fixed set of trajectories one that reduces or eliminates potential collisions, or even to generate a new trajectory on the fly.

While not necessarily a safety violation, collisions with static elements of the workcell are generally not desirable. The set of relevant objects can include all objects in the workspace, including both static background such as walls and tables, and moving objects such as workpieces and human workers. Either from prior configuration or run-time detection, sensors 102 and analysis module 342 may be able to infer which objects could possibly be moving. In this case, any of the algorithms described above can be refined to leave additional margins to account for objects that might be moving, but to eliminate those margins for objects that are known to be static, so as not to reduce throughput unnecessarily but still automatically eliminate the possibility of collisions with static parts of the work cell.

Beyond simply leaving margins to account for the maximum velocity of potentially moving objects, state estimation techniques based on information detected by the sensing system can be used to project the movements of humans and other objects forward in time, thus expanding the control options available to control routines 350. For example, skeletal tracking techniques can be used to identify moving limbs of humans that have been detected and limit potential collisions based on properties of the human body and estimated movements of, e.g., a person's arm rather than the entire person.

4.4 Communicating Safe Action Constraints to the Robot

The safe-action constraints identified by SADM 425 may be communicated by OMS 410 to robot controller 407 on each cycle via a robot communication module 430. As described above, communication module may correspond to an I/O port 327 interface to a complementary port on robot controller 407 or may correspond to transceiver 325. Most industrial robots provide a variety of interfaces for use with external devices. A suitable interface should operate with low latency at least at the control frequency of the system. The interface can be configured to allow the robot to be programmed and run as usual, with a maximum velocity being sent over the interface. Alternately, some interfaces allow for trajectories to be delivered in the form of waypoints. Using this type of an interface, the intended trajectory of robot 402 can be received and stored within OMS 410, which may then generate waypoints that are closer together or further apart depending on the safe-action constraints. Similarly, an interface that allows input of target joint torques can be used to drive trajectories computed in accordance herewith. These types of interface can also be used where SADM 425 chooses new trajectories or modifies trajectories depending on the safe-action constraints.

As with the interface used to determine robot state, if robot 402 supports a safety-rated protocol that provides real-time access to the relevant safety-rated control inputs, this may be sufficient. However, if a safety-rated protocol is not available, additional safety-rated software on the system can be used to ensure that the entire system remains safe. For example, SADM 425 may determine the expected speed and position of the robot if the robot is operating in accordance with the safe actions that have been communicated. SADM 425 then determines the robot's actual state as described above. If the robot's actions do not correspond to the expected actions, SADM 425 causes the robot to transition to a safe state, typically using an emergency stop signal. This effectively implements a real-time safety-rated control scheme without requiring a real-time safety-rated interface beyond a safety-rated stopping mechanism.

In some cases a hybrid system may be optimal—many robots have a digital input that can be used to hold a safety-monitored stop. It may be desirable to use a communication protocol for variable speed, for example, when intruding objects are relatively far from the robot, but to use a digital safety-monitored stop when the robot must come to a complete stop, for example, when intruding objects are close to the robot.

5. Monitoring a Multi-Cell Workspace

Figure 6:
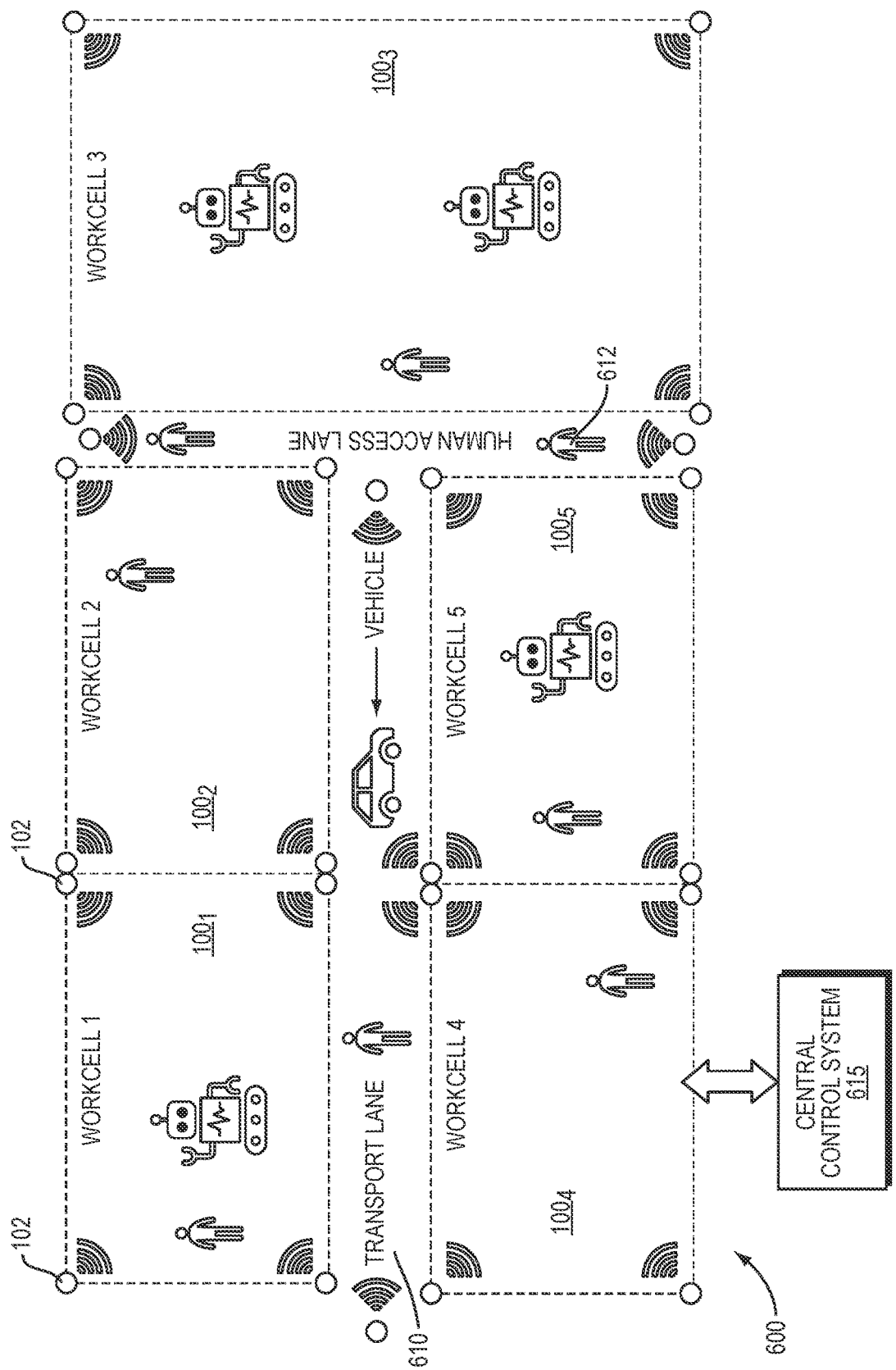
FIG. 6 schematically illustrates a workspace including a plurality of monitored workcells.

As illustrated in FIG. 6, a plurality of workcells (each with its own monitoring system) $100_1 \ldots 100_5$ may be arrayed on a factory floor 600, either contiguously or separated by workspaces, lanes or other areas where manufacturing activities do not take place but facilitate circulation, storage, and/or access to the workcells 100. For example, a transport lane 610 may facilitate vehicular movement of work in progress or materials, while a human access lane 612 may be dedicated to human traffic and exclude vehicles. The areas where manufacturing does not take place may also be covered by arrays of sensors 102 so that a contiguous factory floor area (a "covered space") can be completely managed by one or more OMSs 410 (see FIG. 4).

In one mode of operation, a plurality of OMSs 410 share sensors 102; that is, an OMS 410 responsible for a particular workcell 100 or other zone (e.g., a transport lane 610) shares sensor data with the OMSs of adjacent zones. But each OMS 410 is actually responsible, in the sense of communicating with controllers 407, only for its zone. The covered space 600 is thereby divided up into separate, possibly overlapping safety zones, each of which is the responsibility of a single OMS 410. Data from each sensor, however, is sent not only to the OMS 410 responsible for the monitored zone, but also to OMSs responsible for adjacent zones. Each OMS 410 operates independently as described above, communicating with sensors to coordinate timing so that illumination from one sensor is not improperly sensed by another, but also possibly receiving data from adjacent zones. This configuration may be used, for example, in the case of an assembly line, where a separate set of sensors 102 is arrayed above each assembly-line workcell. The spacing between the sensors along the assembly line may be fixed or variable, depending on the lengths of the workcells.

In FIG. 6, each of the five workcells $100_1 \ldots 100_5$ represents a manufacturing step, with work in progress handed off between workcells either adjacently (e.g., by a conveyor belt from Workcell 1 to Workcell 2), using humans (between Workcell 2 and Workcell 3 using human access lane 612), or via a vehicle—which can be a forklift, an automated guided vehicle, an autonomous vehicle, or even a pushcart (as between Workcell 3 and Workcell 4) using transport lane 610.

The approach described herein allows for the safe monitoring and control of multiple workcells and other zones (each of which is monitored by an OMS 410, which may be associated with a discrete control system 112 or, in some implementations, a single control system 112 may support multiple OMSs 410 each associated with a different monitored zone) in the presence of humans and other moving equipment. This monitoring and control allows humans and machines (either moving or fixed) to safely operate in the same space across multiple workcells and workspaces in a factory. Embodiments of the invention operate by registering the sensors 102 responsible for each monitored zone 100 with respect to other zones' sensors and with respect to any fixed equipment under control in the monitored zone 100, as described above, and continuing to safely monitor this registration during operation of the factory; for each monitored zone 100, analyzing sensor input from the zone itself and from adjacent zones to identify regions that are occupied or may be occupied in the future by humans or other moving machinery; identifying and classifying objects in each monitored zone the motion of objects between adjacent monitored zones; maintaining a record of the identified objects and their positions and trajectories, as well as occlusions and unsafe spaces in each of the monitored zones; in some embodiments, transferring that information to OMSs responsible for adjacent zones as humans and machinery move between zones; and generating control outputs for machinery and for moving equipment in the monitored zones so as to allow safe interaction with humans.

These control outputs may include safety slow or stop signals for equipment or moving machinery that has been designated as dangerous if it comes in close proximity or contact with humans or other objects classified as obstructions. This designation can be temporary, for example, for an object identified as an autonomous vehicle, which may carry work in progress independently of human interaction; while stopped, the vehicle is safe for humans to approach. The designation can instead be permanent, as for a robot that does not interact with humans at any time during operation.

Embodiments of the invention may include methods and equipment for mapping individual sensors to other sensors in the same or adjacent monitored zone, and OMSs (and, in some cases, discrete control systems 112) assigned to specific zones; methods and equipment for interference and crosstalk mitigation among sensors in a zone and among sensors in adjacent zones; methods and equipment for safely transferring occlusion and unsafe-space data in a specific zone to adjacent zones; and methods and equipment for dynamically mapping control signals to specific machinery, which can be stationary (e.g., robots mounted on a fixed base) or mobile (e.g., automated guided vehicles).

With reference to FIGS. 3-6, in another mode of operation, instead of having controllers responsible for adjacent workspace areas cooperate with each other individually as described above, a central supervisory control system 615 oversees multiple sets of zone-specific sensors 102 or even the entire workspace 600, and receives data from all sensors 102 under its supervision. Central control system 615, which may have the same overall architecture as control system 112, stores a space map 345 of the multi-zone area it monitors; the constituent zones of the space map may be represented separately as zone maps to simplify communication with the controllers 407 that control equipment 402 in each zone. The zone maps are contiguous at the voxel level, so that explicit registration among sensors in different zones is unnecessary. Movement of people or equipment from zone to zone is readily predicted, and in this embodiment, central control system 615 transmits details of an impending intrusion to the OMS 410 responsible for the affected zone. That OMS integrates the transmitted details into its space map representation of its zone representation and reacts accordingly to maintain safe conditions therein—e.g., shutting down or limiting operation of equipment in the computed path of an intruding human or taking no action if the intruder is, for example, a conveyance system equipped to interact with workcell equipment to avoid collision.

5.1 Registering and Monitoring Sensors Among Zones

For embodiments that utilize local communication among OMSs assigned to adjacent zones, registration among sensors 102 (both in the same zone and in adjacent zones) can be achieved by comparing all or part of each sensor image to the images generated by other sensors and using conventional computer-vision techniques to identify correspondences among those images. If there is sufficient overlap among the fields of view of the various sensors, and sufficient detail in the monitored space to provide distinct images, it may be enough to compare images of the static zone. If this is not the case, then as described above, a registration object having a distinctive signature in 3D can be placed in a location where it can be seen by a sufficient number of sensors. This object can be mounted on a cart and moved through the different monitored zones so as to facilitate joint registration of sensors covering all the zones and, thereby, registration between adjacent zones. If sufficient overlap between sensor fields of view is not present, registration can instead be based on knowledge of the relative positions and orientations of the machinery.

Alternatively, registration can be achieved by allowing the system—i.e., central controller 615 via all of the sensors 102—to observe one or more humans walking throughout the entire covered space 600 over a period of time, or mobile vehicles moving between zones, combining a sufficient number of partially matching images until accurate registration between adjacent workcells and workspaces is obtained. A conventional mapping tool providing a visual representation of the sensors 102 on the factory floor 600 may be employed to help lay out the required number of sensors at the proper locations to cover the entire area without spatial coverage gaps.

Other approaches to registration include the placement within zones of permanent markers or fiducials whose only purpose is registration, allowing for continuous verification of registration among the sensors for each zone (and those of adjacent zones whose fields of view include the marker). These markers may be sensitive to visible light, for example, so that an RGB camera permanently aligned with the sensors can serve as a registration device, or alternatively, the markers may be IR-sensitive so they can be detected by other sensing modalities such as IR time-of-flight sensors.

The same algorithms used for initial registration can be extended to monitor continued accuracy of registration. A metric (e.g., squared error) can be calculated during initial registration, capturing the accuracy of fit of the observed data to a model of static elements (for example, fixtures or light poles) within the overall space 600. As the system operates, the same metric can be recalculated. If that metric exceeds a specified threshold, the registration is considered to be invalid and an error condition is triggered in the software which will transition the machinery to a safe state. This safe state can be local to a specific zone or area of the factory 600 or may cover some or all of the zones. Insufficiently observable areas that are guarded by other modalities may be considered safe and override the built-in inherent safety.

5.2 Identifying Occupied and Potentially Occupied Areas Between Workcells and Workspaces Once the sensors have been registered across all active zones, the system identifies, at a high fixed frequency, all intrusions in the zones monitored by the system. Data from multiple sensors in a zone are aggregated to identify, at a voxel level, the 3D boundaries of the zone. In embodiments employing a central control system 615, this boundary data is aligned with data from adjacent zones to map the entire covered space 600 at the voxel level. As described above, if a sensor detects anything in a given voxel, all voxels that lie further from the sensor on the ray beginning at the focal point of that sensor and passing through the occupied voxel are then determined to be occluded for that sensor; whereas everything lying between the sensor and the occupied voxel can be considered empty.

Control system 615 combines information from all sensors 102 to determine which areas are jointly occluded from all sensors in specific zones and across adjacent zones. If necessary, redundant sensors can be used so that a voxel must be observed by more than one sensor in order to be considered empty by the system. All space that cannot be confirmed as empty is marked as unknown. Central control system 615 may also perform background subtraction as described above, identifying all voxels occupied by the static elements of the zones. The 3D models of machinery designed to move among zones (for example, forklifts, automated guided vehicles, rails, conveyors, and mobile robots or robots mounted on vehicles) are considered part of the "background" but are identified as objects capable of moving inside or between zones. This 3D data model of the factory 600 can be generated by commercially available factory-design software tools.

Once again a teaching step can also be included. In one approach, individual pieces of mobile machinery, conveyors, etc. are operated in isolation, and central control system 615 may include a machine learning component (e.g., a neural network) that learns the expected motions of each piece of mobile equipment based on the teaching step. In addition, as noted above, the teaching step may supply images or key features of a workpiece. The trained system may thereby develop an internal model of expected motion (and/or maximum velocity) of movable equipment in order to predict possible collisions within a zone or between zones. With the ability to recognize mobile equipment and workpieces, the system can conservatively treat all unrecognized objects as potentially human and to be avoided. Alternatively or in addition, entries from a simple reference library of object motions and maximum velocities can be associated with mobile objects as they are identified, either specifically or by category (e.g., forklifts or motorized carts) and provide the basis for motion prediction.

A second approach is to specify particular regions in a factory-level space map 345 where mobile elements will enter a zone, such as the zone edges. Only objects that enter a zone at such specified locations are considered eligible to move into and within the zone; otherwise an object is identified as an intrusion. The moving objects can then be modeled and tracked from the time they enter the covered space until the time they leave it. Modeling can involve simple extrapolation of the current object trajectory, taking into account obstructions and the likely path around them, or can be based on movement capabilities associated with the object or its class. The actual trajectory may be confirmed at the next mapping cycle and a new trajectory recomputed. Alternatively, the planned trajectory may be supplied by the moving object, e.g., as a wireless transmission to the workspace-level control system 615 or to the local zone OMS, which may share the data with OMSs of adjacent zones so that zone-spanning object trajectories can be tracked.

Mobile elements not identified as intrusions can be subtracted from future measurements, but continuous monitoring ensures that the observed background image is consistent with the image stored during the startup period. Additionally, it is necessary to identify areas occluded by objects in the background, and handle these unknown areas correctly as described above. These occlusions can be permanent, such as those created by fixed machinery in the workcell, or they can be temporary, such as those created by a moving vehicle or a human within a zone. Moving objects previously identified as eligible to operate in a zone may be monitored by central control system 615 or local zone OMSs and prospectively tracked based on all possible object configurations, physical positions and velocities.

5.3 Classifying Objects in and Between Zones

At their simplest level, the above procedures provide central control system 615 with an internal, voxel-level representation of each monitored zone 100 specifying regions that are known to be occupied and/or potentially occupied. For some applications, this rudimentary representation may be sufficient—that is, if the system is monitoring space in which there should be no moving objects other than those identified as part of the background. More commonly, however, object-level identification is necessary, e.g., where normal operation involves moving machinery parts, work in progress, mobile robots or other vehicles, etc. Such objects are usually not part of the original background map of fixed and mobile objects, and to identify them, it is generally useful to cluster individual occupied voxels for analysis at a higher (i.e., object) level as described above.

In particular, clusters can be tracked over time simply by associating clusters in the current sensor-image frame with nearby clusters in previous frames or using more sophisticated techniques (such as k-means clustering or support vector machines), either within a zone or between adjacent zones. The shape, size, or other features of a cluster can be identified and tracked from one zone to the next as it crosses known zone boundaries. Once the clusters have been identified, additional techniques can be applied to classify and map their precise location as they move. Certain moving objects, such as mobile robots or automated guided vehicles, may have the ability to wirelessly transmit (using one of the above-noted communication protocols, for example) their classification, location, and orientation to external sensing elements or directly to central control system 615 or local control systems 112. A moving object may utilize location beacons or fiducial markers that it can identify in order to ascertain its location. Other moving objects, including those that are not traditionally fitted with sensors (such as forklifts, workpieces, work in process, or even humans) can be independently fitted with location sensors that may be then be mapped to identified voxel clusters for classification.

Another approach is to use external inputs to mark specific clusters as being humans, machinery, work in progress, or workpieces through a user interface. An initial object-level classification of identified clusters can be performed based on this external input. Input data may come from operators manually identifying specific clusters as machines, humans, workpieces, or work in progress, or from learning software (e.g., a Bayes classifier or a system configured for object detection and classification) that automatically classifies specific clusters from information in its database or prior knowledge. One embodiment of this approach is to identify all known objects in the space and classify anything else as an obstruction. In another embodiment, only those items needing protection, such as humans, are positively identified. Any cluster not classified in the initial step (such as a human entering the covered area after classification) may be considered an obstruction to be avoided by moving machinery.

5.4 Maintaining and Updating Record of Objects, Occlusions, and Unsafe Spaces in the Workcells and Workspaces In a central-controller implementation, zone-level occlusion data may be reduced and the boundaries of all zones identified and merged in a factory-level space map. In one embodiment, a zone-level data structure stores moving object positions, current and future trajectories, and all occlusions and obstructions in the associated zone. Central control system 615 passes this data structure to adjacent zones as humans, mobile machines, or work in progress move (or are predicted to possibly move) between zones. The data structure may be a C structure or linked list, a Python list or dictionary, a table, a relational or flat-file database, or other suitable representation.

In distributed, zone-level implementations, on the other hand, each OMS associates a data structure with each identified and classified mobile object (be it a human, a machine, or work in progress) in the zone and passes this data structure to OMSs of adjacent zones as the classified mobile objects move between (or are predicted to move between) zones. An object's data structure is updated, in real time as the object moves, with its new location, trajectory, and possible future position. As object motion alters the occlusions and unsafe spaces in the zone, the occlusion and unsafe space map is also updated.

For example, as a human moves in a workcell, space occluded by the human as seen by a specific sensor becomes visible while other space previously visible becomes occluded. This information is used to update the zone-level data structure and/or data structures associated with each of the moving objects in the zone. These moving objects may include machinery that moves in place, such as a robot that is fixed in place but is able to move its arm over a fixed volume, generating occlusions, obstructions, and unsafe spaces (e.g., pinch points) as it moves.

5.5 Generating Safe Control Outputs from the Covered Zone

At this stage, central control system 615 has, or the zone-specific OMSs collectively have, identified all objects (fixed, movable, and intrusions such as humans), their locations, and their trajectories that must be considered for safety purposes. All occlusions and unsafe spaces associated with the objects (both fixed and movable) have been identified and mapped. Given these data, a variety of control outputs can be generated. Since all of the steps performed thus far can be implemented for safety-critical applications, these control outputs can meet relevant reliability standards.

The simplest types of output are binary signals indicating intrusions in various zones. These binary signals can be independent or connected through PLCs dedicated to the workspace mapping system (e.g., analysis module 342). These signals can be further connected to external safety PLCs to aggregate to the factory-level SCADA or MES system, as well as directly to equipment within the workspace for immediate response. Zone intrusion information can also be delivered over a digital communication protocol such as fieldbus, ethernet, or wireless. The SCADA or MES system can then relay slow down, stop, or other safety information to machinery (either fixed or mobile) inside the covered space, whose dedicated controllers will issue appropriate commands. This information transfer can occur through wired or wireless means. A wireless signal interface may be required, for example, when relaying safety information to a mobile robot.

Another desirable output is the distance between any intrusion in the sensed area and a moving or stationary machine, comparable to the output of a 2D proximity sensor. This quantity may be converted into a binary signal using a proximity threshold below which the output is asserted. It may also be desirable for the system (i.e., central control system 615 or the OMSs) to provide the location, extent and/or shape of the intrusions closest to the machine.

The possibility of collisions may be monitored as described above with respect to FIG. 5, using concentric 3D safety envelopes. The locations and 3D extents of these safety envelopes are updated at each time step as the machinery operates and humans or mobile machinery classified as intrusions move about and among safety envelopes 502, 508, 510. These updates are effected by refreshing the data structures that maintain, in real time, the location and trajectory of all objects in the workcell and the occlusions and unsafe spaces they generate as they move in the workcell and between zones. The volumes surrounding the moving objects (determined by their position and estimated trajectories) that are deemed unsafe for volumes of nearby objects to overlap are continuously checked for collisions or movements that bring them on a potential collision course.

In various embodiments, if safety envelopes approach each other, the machinery is slowed down or stopped and the humans in the workcell are alerted with a warning. If envelopes intersect, the machinery is halted and a safety violation alert is sounded. When the human causing the warning or violation moves out of the way, the alarm ceases, and the machinery resumes its normal operation. As objects move through the zones, the signals associated with specific machinery (for example, an emergency stop for a mobile robot) may be dynamically mapped to different controllers 407 as the mobile machinery and the humans move between zones. This allows the specific control loop for a piece of machinery to "follow" the machine as it travels. This signal handoff may be performed in a safety-rated manner, with dual channel signal paths and fail-safe architectures.

5.6 Safety Architecture Description and Considerations

Because systems utilizing the approaches described herein involve human safety, the architecture and operation of the system should meet industrial safety standards relating to uptime, latency, and protection from interference. In distributed embodiments, each of the zone sensor arrays and the associated OMS can be considered an independent unit of operation, with its own safety protocol and operation. As detailed above, these zone-level systems can be connected to the systems of adjacent zones (for example, to identify intrusions moving from zone to zone) so that communication is independent and to adjacent nearest neighbors only. Communications between zones desirably take place using protocols that are dual-channel and fail-safe, allowing for safety-rated communication and operation.

In distributed embodiments, the overall site area 600 can be considered a collection of linked but independent sensing systems, with low latency as the unit of control is a small number of sensors and an OMS. However, if using active sensing (such as ToF sensors) this architecture may exhibit interference between adjacent zones as each OMS operates independently and sensor triggering across zones is not coordinated. To mitigate this, even in fully distributed embodiments each small group of zones may have a local master OMS that coordinates the triggering and data capture of the sensors of that small group of workcells. The local masters of all the grouped workcells coordinate to mitigate interference among the zone groups and, therefore, at the zone level as well. Mitigations may involve time-multiplexing the sensors so that they cannot interfere, or time-varying the frequencies of excitation so that the signal interference is minimized. Alternatively, each small group of zones can communicate using peer-to-peer communication algorithms such as random backoffs.

In centralized embodiments, all the sensors are controlled by central control system 615, which triggers data capture sequentially so as to avoid interference among sensors. This can be achieved using, for example, time-division or frequency-division multiplexing, where central control system 615 assigns frequencies or time slices to zones and sensors during the startup or configuration phase. Alternatively, central control system 615 can receive data from sensors over a high-speed safety-rated connection (which can be wireless), minimizing latency and eliminating the need for a separate enforcement mechanism.

In addition to zone-level processors, the overall system may have a supervisory processor that continuously checks the functioning and state of each sensor, sensor group, and controllers, identifying fault conditions, both from intrusions and from equipment failures or interference. Furthermore, the data structures that contain the position, trajectory, occlusion and unsafe space data for each identified object may also be stored and maintained in a safety-rated manner. As the data structures are updated, backup copies may be sent to central control system 615, which continuously verifies that the two copies of the data structure (its own and those generated by zone OMSs) are always identical. Any deviation in form or content may trigger an alarm and a stop signal for the specific object where there is a data mismatch, or the system as a whole. The communication protocol that transfers the object data structure between controllers is also desirably dual channel, so that failures of the communication channel do not trigger system failures unrelated to potential collisions or unsafe conditions on the factory floor.

Certain embodiments of the present invention are described above. It is, however, expressly noted that the present invention is not limited to those embodiments; rather, additions and modifications to what is expressly described herein are also included within the scope of the invention.

What is claimed is:

1. A safety system for identifying safe regions in a three-dimensional workspace that includes controlled machinery and a plurality of workcells distributed about the workspace, the system comprising, with respect to each workcell, a controller configured to:

generate a three-dimensional representation of at least a portion of the workcell based on images obtained by a plurality of sensors;

map one or more safe zones within the workcell, the safe zones being outside a safety zone of the machinery;

receive, from a second controller, a three-dimensional representation of at least a portion of an adjacent workcell; and transmit, to the second controller, at least a portion of the three-dimensional representation of the at least a portion of the workcell.

2. The safety system of claim 1, wherein the controller is further configured to classify three-dimensional portions within the workcell as unoccupied, occupied or unknown, the one or more safe zones each being a three-dimensional portion classified as unoccupied.

3. The safety system of claim 2, wherein the three-dimensional portions within the workcell partially overlap.

4. The safety system of claim 1, wherein said at least a portion of the three-dimensional representation received from the second controller is classified as unoccupied, occupied or unknown.

5. The safety system of claim 1, wherein the controller is further configured to transmit, to the second controller, predicted movements of objects in the workcell into the adjacent workcell.

6. The safety system of claim 5, wherein the second controller is responsive to the predicted movements and is configured to alter operation of machinery in the adjacent workcell in response to a predicted intrusion into a safe zone of the adjacent workcell.

7. The safety system of claim 6, wherein the second controller is configured to computationally extend the predicted intrusion into the adjacent workcell in accordance with a model of human movement.

8. The safety system of claim 6, wherein the second controller is configured to computationally extend the predicted intrusion into the adjacent workcell in accordance with a trajectory of an autonomous guided vehicle.

9. The safety system of claim 8, wherein the second controller is configured to receive the trajectory from the autonomous guided vehicle.

10. The safety system of claim 1, wherein the safety zone is a 3D volume surrounding at least a portion of the machinery.

11. A method of identifying safe regions in a three-dimensional workspace that includes controlled machinery and a plurality of workcells distributed about the workspace, the method comprising the steps of:
   obtaining, by a plurality of sensors, images of at least a portion of the workcell;
   generating a three-dimensional digital representation of the at least a portion of the workcell based on the images;
   computationally mapping one or more safe zones within the workcell, the safe zones being outside a safety zone of the machinery;
   generating a three-dimensional representation of at least a portion of an adjacent workcell; and
   combining the generated three-dimensional representations.

12. The method of claim 11, further comprising the step of computationally classifying three-dimensional portions within the workcell as unoccupied, occupied or unknown, the one or more safe zones each being a three-dimensional portion classified as unoccupied.

13. The method of claim 12, wherein the three-dimensional portions within the workcell partially overlap.

14. The method of claim 11, further comprising the step of computationally classifying three-dimensional portions within the adjacent workcell as unoccupied, occupied or unknown, one or more safe zones within the adjacent workcell each being a three-dimensional portion classified as unoccupied.

15. The method of claim 11, further comprising the step of computationally predicting movements of one or more objects in the workcell into the adjacent workcell.

16. The method of claim 15, further comprising the step of altering operation of the machinery in the adjacent workcell in response to a predicted intrusion into a safe zone of the adjacent workcell.

17. The method of claim 16, further comprising the step of computationally extending the predicted intrusion into the adjacent workcell in accordance with a model of human movement.

18. The method of claim 16, further comprising the step of computationally extending the predicted intrusion into the adjacent workcell in accordance with a trajectory of an autonomous guided vehicle.

19. The method of claim 11, wherein the safety zone is a 3D volume surrounding at least a portion of the machinery.

20. A safety system for identifying safe regions in a three-dimensional workspace including controlled machinery and a plurality of workcells distributed about the workspace, the system comprising:
   a supervisory controller; and
   associated with each workcell, a local controller configured to:
      generate a three-dimensional representation of at least a portion of the workcell based on images obtained by a plurality of sensors;
      map one or more safe zones within the workcell, the safe zones being outside a safety zone of the machinery; and
      transmit, to the supervisory controller, at least a portion of the three-dimensional representation of the workcell,
   wherein the supervisory controller is configured to transmit, to each local controller, predicted movements of one or more objects into the workcell associated with the local controller based on data received from one or more other local controllers.

21. The safety system of claim 20, wherein the local controller of each workcell is further configured to classify three-dimensional portions within the workcell as unoccupied, occupied or unknown, the one or more safe zones each being a three-dimensional portion classified as unoccupied.

22. The safety system of claim 21, wherein the three-dimensional portions within the workcell partially overlap.

23. The safety system of claim 20, wherein the safety zone is a 3D volume surrounding at least a portion of the machinery.

24. The safety system of claim 20, wherein the local controller of each workcell is responsive to the predicted movements and is configured to alter operation of machinery in the workcell in response to a predicted intrusion into a safe zone thereof.

25. The safety system of claim 20, wherein the local controller of each workcell is configured to computationally extend a predicted intrusion into the workcell in accordance with a model of human movement.

26. The safety system of claim 20, wherein the local controller of each workcell is configured to computationally extend a predicted intrusion into the workcell in accordance with a trajectory of an autonomous guided vehicle.

27. The safety system of claim 26, wherein the local controller of each workcell is configured to receive the trajectory from the autonomous guided vehicle.

28. The safety system of claim 26, wherein the supervisory controller is configured to receive the trajectory from the autonomous guided vehicle.

* * * * *